US012699932B2

(12) United States Patent
Balaji

(10) Patent No.: US 12,699,932 B2
(45) Date of Patent: Aug. 4, 2026

(54) SYSTEM, METHOD, AND COMPUTER PROGRAM PRODUCT FOR GENERATING ERROR RATE PREDICTIONS BASED ON MACHINE LEARNING USING INCREMENTAL BACKPROPAGATION

(71) Applicant: Visa International Service Association, San Francisco, CA (US)

(72) Inventor: Priyanka Balaji, Saligramam (IN)

(73) Assignee: Visa International Service Association, San Francisco, CA (US)

( * ) Notice: Subject to any disclaimer, the term of this patent is extended or adjusted under 35 U.S.C. 154(b) by 1134 days.

(21) Appl. No.: 17/731,427

(22) Filed: Apr. 28, 2022

(65) Prior Publication Data

US 2023/0351269 A1 Nov. 2, 2023

(51) Int. Cl.
*G06N 20/20* (2019.01)
*G06F 16/28* (2019.01)

(52) U.S. Cl.
CPC ........... *G06N 20/20* (2019.01); *G06F 16/285* (2019.01)

(58) Field of Classification Search
CPC .............................. G06N 20/20; G06F 16/285
See application file for complete search history.

(56) References Cited

U.S. PATENT DOCUMENTS 7,574,430 B2 8/2009 Matias et al.
2017/0052652 A1 2/2017 Denton et al.

2020/0151610 A1* 5/2020 Chueh .................... G06N 20/20
2021/0224275 A1* 7/2021 Maheshwari .......... G06N 3/044
2022/0197900 A1* 6/2022 Maheshwari ..... G06F 16/90324

OTHER PUBLICATIONS

Thomas Rincy, etc. "Ensemble Learning Techniques and its Efficiency in Machine Learning: A Survey", published via 2nd International Conference on Data, Engineering, and Applications (IDEA), Feb. 28-29, 2020, Bhopal, India, retrieved Sep. 11, 2025. (Year: 2020).*

M.A. Ganaie, etc., "Ensemble deep learning: A review", published on Mar. 8, 2022 to arXiv, retrieved Sep. 11, 2025. (Year: 2022).*

(Continued)

*Primary Examiner* — Shourjo Dasgupta
(74) *Attorney, Agent, or Firm* — The Webb Law Firm

(57) ABSTRACT

Provided are systems for predicting an error rate and identifying the source of the error for generating a data report prior to generating the data report in a data reporting system that includes a processor to receive a dataset of a plurality of data instances, train a first prediction model based on data instances corresponding to a first category of parameters, train a second prediction model based on data instances corresponding to a second category of parameters, train a third prediction model based on data instances corresponding to a third category of parameters, train an ensemble machine learning model based on an output of the first prediction model, an output of the second prediction model, and an output of the third prediction model to provide a trained ensemble machine learning model, and generate a runtime output of the trained ensemble machine learning model based on a runtime input.

20 Claims, 9 Drawing Sheets

(56)

References Cited

OTHER PUBLICATIONS

Yaxian Hu, etc., "Deep supervised learning with mixture of neural networks", published to Artificial Intelligence in Medicine, vol. 102 (2020), retrieved Sep. 11, 2025. (Year: 2020).*

Saeed Masoudnia, etc., "Mixture of experts: a literature survey", published to Artif. Intell. Rev., vol. 42, pp. 275-293 (2014), retrieved Sep. 11, 2025. (Year: 2014).*

CommonLounge Archive, "Ensemble Methods—Part 3: Meta-learning, Stacking and Mixture of Experts", published on Oct. 13, 2017 to https://www.commonlounge.com/ensemble-methods-part-3-meta-learning-stacking-and-mixture-ofexperts-9331c0d004704e89bd4d1da08fd7c7bc, retrieved Sep. 12, 2025. (Year: 2017).*

Shahid Ali, etc., "Ensemble Learning Methods for Decision Making: Status and Future Prospects", made available via the 14th International Conference on Machine Learning and Cybernetics (ICMLC), 2015, retrieved Mar. 26, 2026. (Year: 2015).*

"In-memory Analytics Guide", Product Manual [online]. MicroStrategy: Analytics and Mobility, Dec. 2021, pp. 1-377. Retrieved from the internet: <URL: https://www2.microstrategy.com/producthelp/manuals/en/InMemoryAnalytics.pdf>.

* cited by examiner

FIG. 1
100
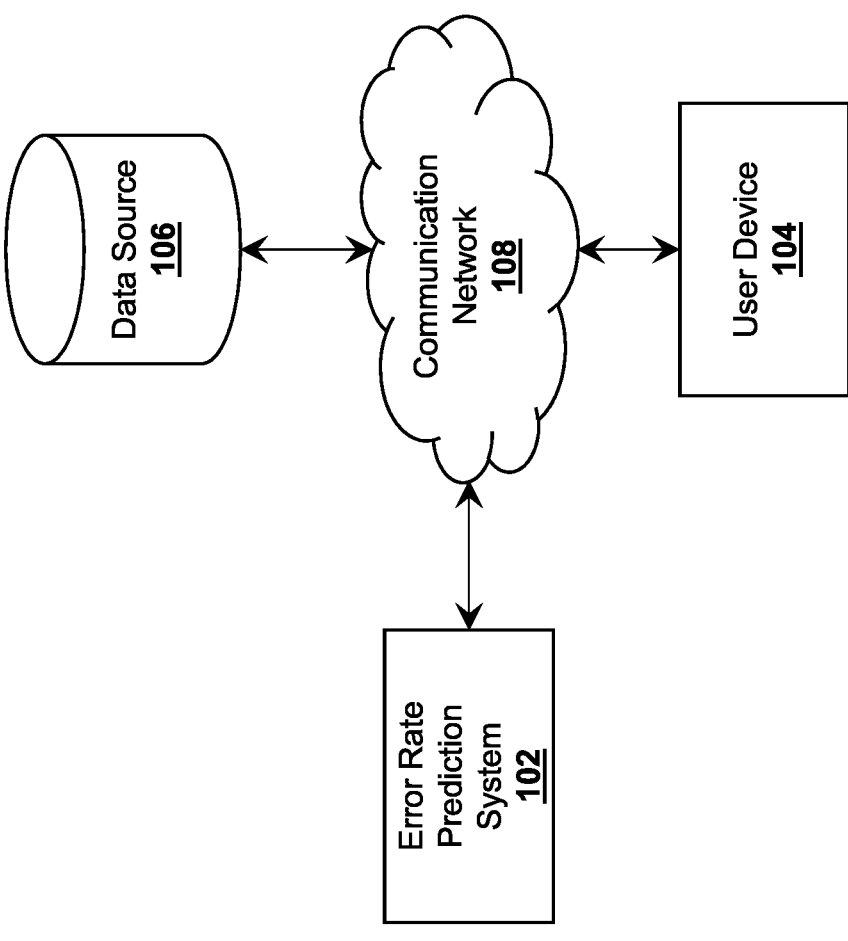

302

Receive dataset

304

Train first prediction model

306

Train second prediction model

308

Train third prediction model

310

Train ensemble model

312

Generate runtime output

300

400

Training Dataset

| First Category of Parameters | Second Category of Parameters | Third Category of Parameters |
|---|---|---|
| Data Instance | Data Instance | Data Instance |
| . . . . . | . . . . . | . . . . . |

Error Rate Prediction System 102

405
Receive a dataset

SYSTEM, METHOD, AND COMPUTER PROGRAM PRODUCT FOR GENERATING ERROR RATE PREDICTIONS BASED ON MACHINE LEARNING USING INCREMENTAL BACKPROPAGATION

BACKGROUND

1. Field

This disclosure relates generally to machine learning and, in some non-limiting embodiments or aspects, to systems, methods, and computer program products for generating error rate predictions based on a trained machine learning model using incremental backpropagation.

2. Technical Considerations

Machine learning may refer to a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task (e.g., a task associated with a prediction) with regard to the set of data.

In some instances, a machine learning model, such as a predictive machine learning model, may be used to make a prediction regarding a risk or an opportunity based on a large amount of data (e.g., a large scale dataset). A predictive machine learning model may be used to analyze a relationship between the performance of a unit based on a large scale dataset associated with the unit and one or more known features of the unit. The objective of the predictive machine learning model may be to assess the likelihood that a similar unit will exhibit the same or similar performance as the unit. In order to generate the predictive machine learning model, the large scale dataset may be segmented so that the predictive machine learning model may be trained on data that is appropriate.

In some instances, a software tool for generating a data report may allow a user to select parameters in a user interface in order to generate the data report (e.g., MicroStrategy® and/or the like). For example, the user may use a commercially available tool to generate a data report by selecting a date range, a company, and sales data (e.g., total sales revenue, total number of products sold, and/or the like). The generation of data reports may be accomplished by fetching data from one or more data sources based on the parameters selected by the user. Once all desired parameters have been selected by the user, the software tool may generate the report with the selected parameters. In some instances, the software tool may generate the data report by constructing a Structured Query Language (SQL) query based on the selected parameters. The software tool may then execute the constructed SQL queries against a data source (e.g., database, data store, data warehouse, and/or the like) to retrieve the data indicated by the selected parameters. The data may then be presented to the user in the form of a report and/or graphical visualizations.

However, an SQL query may be susceptible to failure when they are executed. This may result in partial or incomplete retrieval of data and the generation of an incomplete data report. In addition, the user may not be aware of errors encountered during generation of the data report until after the SQL queries have been executed. The problems of failure of an SQL query, incomplete retrieval of data, and/or generation of an incomplete data report may be amplified when the user selects a large amount of parameters, resulting in a large number of complex SQL queries. In such an instance, the user may have to wait an undesirable amount of time (e.g., up to one hour or longer) from the time at which the data report is initiated to be generated with the selected parameters until the software tool informs the user that an error has occurred. Further, the software tool may not provide the user with a cause of the error. Thus, the user would not have any insight on how to fix the error. Accordingly, the user may be required to engage in a trial-and-error process by selecting new parameters until another report is generated without an error.

SUMMARY

Accordingly, disclosed are systems, methods, and computer program products for generating error rate predictions of data reports based on a trained machine learning model using incremental backpropagation.

According to non-limiting embodiments or aspects, provided is a system, the system for generating an error rate prediction of a data report based on a trained machine learning model using incremental backpropagation including at least one processor. The processor may be programmed and/or configured to receive a dataset of a plurality of data instances, the plurality of data instances including at least one data instance corresponding to a first category of parameters, at least one data instance corresponding to a second category of parameters, and at least one data instance corresponding to a third category of parameters. The processor may be further programmed and/or configured to train a first prediction model based on the data instances corresponding to the first category of parameters, the first prediction model is configured to provide an output that includes a first predicted error rate, and the first predicted error rate represents a probability that generating a data report will produce an error based on a parameter in the first category of parameters that is to be included or not included in the data report. The processor may be further programmed and/or configured to train a second prediction model based on the data instances corresponding to the second category of parameters, the second prediction model is configured to provide an output that includes a second predicted error rate, and the second predicted error rate represents a probability that generating a data report will produce an error based on a parameter in the second category of parameters that is to be included or not included in the data report. The processor may be further programmed and/or configured to train a third prediction model based on the data instances corresponding to the third category of parameters, the third prediction model is configured to provide an output that includes a third predicted error rate, and the third predicted error rate represents a probability that generating a data report will produce an error based on a parameter in the third category of parameters that is to be included or not included in the data report. The processor may be further programmed and/or configured to train an ensemble machine learning model based on an output of the first prediction model, an output of the second prediction model, and an output of the third prediction model to provide a trained ensemble machine learning model. The processor may be further programmed and/or configured to generate a runtime output of the trained ensemble machine learning model based on a runtime input, the runtime output including a prediction of a total error rate and an indication of a predicted cause of the total error rate based on one or more parameters selected by a user.

Further embodiments are set forth in the following numbered clauses:

Clause 1: A system, the system comprising: at least one processor programmed or configured to: receive a dataset of a plurality of data instances, wherein the plurality of data instances comprises at least one data instance corresponding to a first category of parameters, at least one data instance corresponding to a second category of parameters, and at least one data instance corresponding to a third category of parameters; train a first prediction model based on the data instances corresponding to the first category of parameters, wherein the first prediction model is configured to provide an output that comprises a first predicted error rate, and wherein the first predicted error rate represents a probability that generating a data report will produce an error based on a parameter in the first category of parameters that is to be included or not included in the data report; train a second prediction model based on the data instances corresponding to the second category of parameters, wherein the second prediction model is configured to provide an output that comprises a second predicted error rate, and wherein the second predicted error rate represents a probability that generating a data report will produce an error based on a parameter in the second category of parameters that is to be included or not included in the data report; train a third prediction model based on the data instances corresponding to the third category of parameters, wherein the third prediction model is configured to provide an output that comprises a third predicted error rate, and wherein the third predicted error rate represents a probability that generating a data report will produce an error based on a parameter in the third category of parameters that is to be included or not included in the data report; train an ensemble machine learning model based on an output of the first prediction model, an output of the second prediction model, and an output of the third prediction model to provide a trained ensemble machine learning model; and generate a runtime output of the trained ensemble machine learning model based on a runtime input, wherein the runtime output comprises a prediction of a total error rate and an indication of a predicted cause of the total error rate based on one or more parameters selected by a user.

Clause 2: The system of clause 1, wherein the at least one processor is further programmed or configured to: perform an action based on the runtime output of the trained ensemble machine learning model.

Clause 3: The system of clauses 1 or 2, wherein, when receiving the dataset of the plurality of data instances, the at least one processor is programmed or configured to: perform a normalization operation on the plurality of data instances to provide a plurality of normalized data instances, wherein each data instance comprises a plurality of data points, and wherein each data point has a value from 0 to 1.

Clause 4: The system of any of clauses 1-3, wherein, when generating a runtime output of the trained ensemble machine learning model, the at least one processor is programmed or configured to: receive a first data instance corresponding to the first category of parameters, wherein the first data instance comprises a plurality of data points, and wherein each data point is an integer representing a first parameter that is selected by the user to be included or not included in the data report; receive a second data instance corresponding to the second category of parameters, wherein the second data instance comprises a plurality of data points, and wherein each data point is an integer representing a second parameter that is selected by the user to be included or not included in the data report; receive a third data instance corresponding to the third category of parameters, wherein the third data instance comprises a plurality of data points, and wherein each data point is an integer representing a third parameter that is selected by the user to be included or not included in the data report; generate a first runtime error rate with the first prediction model based on the first data instance; generate a second runtime error rate with the second prediction model based on the second data instance; generate a third runtime error rate with the third prediction model based on the third data instance; and generate the total error rate and the indication of the predicted cause of the total error rate with the trained ensemble machine learning model based on the first runtime error rate, the second runtime error rate, and the third runtime error rate.

Clause 5: The system of any of clauses 1-4, wherein the first category of parameters is attributes, wherein an attribute is a text string and the at least one data instance corresponding to the first category of parameters comprises a plurality of data points, and wherein each data point is an integer representing the attribute that is to be included or not included in the data report.

Clause 6: The system of any of clauses 1-5, wherein the second category of parameters is metrics, wherein a metric is a numerical value and the at least one data instance corresponding to the second category of parameters comprises a plurality of data points, and wherein each data point is an integer representing the metric that is to be included or not included in the data report.

Clause 7: The system of any of clauses 1-6, wherein the third category of parameters is filters, wherein a filter is a predefined text string or a predefined numerical value, and the at least one data instance corresponding to the third category of parameters comprises a plurality of data points, wherein each data point is an integer equal to 1 or 0, and wherein the integer equal to 1 represents the filter that is included in the data report and the integer equal to 0 represents the filter that is not included in the data report.

Clause 8: A method, the method comprising: receiving, with at least one processor, a dataset of a plurality of data instances, wherein the plurality of data instances comprises at least one data instance corresponding to a first category of parameters, at least one data instance corresponding to a second category of parameters, and at least one data instance corresponding to a third category of parameters; training, with the at least one processor, a first prediction model based on the data instances corresponding to the first category of parameters, wherein the first prediction model is configured to provide an output that comprises a first predicted error rate, and wherein the first predicted error rate represents a probability that generating a data report will produce an error based on a parameter in the first category of parameters that is to be included or not included in the data report; training, with the at least one processor, a second prediction model based on the data instances corresponding to the second category of parameters, wherein the second prediction model is configured to provide an output that comprises a second predicted error rate, and wherein the second predicted error rate represents a probability that generating a data report will produce an error based on a parameter in the second category of parameters that is to be included or not included in the data report; training, with the at least one processor, a third prediction model based on the data instances corresponding to the third category of parameters, wherein the third prediction model is configured to provide an output that comprises a third predicted error rate, and wherein the third predicted error rate represents a probability that generating a data report will produce an error based on a parameter in the third category of parameters that is to be included or not included in the data report; training, with the at least one processor, an ensemble machine learning model based on an output of the first prediction model, an output of the second prediction model, and an output of the third prediction model to provide a trained ensemble machine learning model; and generating, with the at least one processor, a runtime output of the trained ensemble machine learning model based on a runtime input, wherein the runtime output comprises a prediction of a total error rate and an indication of a predicted cause of the total error rate based on one or more parameters selected by a user.

Clause 9: The method of clause 8, further comprising: performing an action based on the runtime output of the trained ensemble machine learning model.

Clause 10: The method of clauses 8 or 9, wherein receiving the dataset of the plurality of data instances comprises: performing a normalization operation on the plurality of data instances to provide a plurality of normalized data instances, wherein each data instance comprises a plurality of data points, and wherein each data point has a value from 0 to 1.

Clause 11: The method of any of clauses 8-10, wherein generating a runtime output of the trained ensemble machine learning model comprises: receiving a first data instance corresponding to the first category of parameters, wherein the first data instance comprises a plurality of data points, and wherein each data point is an integer representing a first parameter that is selected by the user to be included or not included in the data report; receiving a second data instance corresponding to the second category of parameters, wherein the second data instance comprises a plurality of data points, and wherein each data point is an integer representing a second parameter that is selected by the user to be included or not included in the data report; receiving a third data instance corresponding to the third category of parameters, wherein the third data instance comprises a plurality of data points, and wherein each data point is an integer representing a third parameter that is selected by the user to be included or not included in the data report; generating a first runtime error rate with the first prediction model based on the first data instance; generating a second runtime error rate with the second prediction model based on the second data instance; generating a third runtime error rate with the third prediction model based on the third data instance; and generating the total error rate and the indication of the predicted cause of the total error rate with the trained ensemble machine learning model based on the first runtime error rate, the second runtime error rate, and the third runtime error rate.

Clause 12: The method of any of clauses 8-11, wherein the first category of parameters is attributes, wherein an attribute is a text string and the at least one data instance corresponding to the first category of parameters comprises a plurality of data points, and wherein each data point is an integer representing the attribute that is to be included or not included in the data report.

Clause 13: The method of any of clauses 8-12, wherein the second category of parameters is metrics, wherein a metric is a numerical value and the at least one data instance corresponding to the second category of parameters comprises a plurality of data points, and wherein each data point is an integer representing the metric that is to be included or not included in the data report.

Clause 14: The method of any of clauses 8-13, wherein the third category of parameters is filters, wherein a filter is a predefined text string or a predefined numerical value, and the at least one data instance corresponding to the third category of parameters comprises a plurality of data points, wherein each data point is an integer equal to 1 or 0, and wherein the integer equal to 1 represents the filter that is included in the data report and the integer equal to 0 represents the filter that is not included in the data report.

Clause 15: A computer program product, the computer program product comprising at least one non-transitory computer-readable medium including one or more instructions that, when executed by at least one processor, cause the at least one processor to: receive a dataset of a plurality of data instances, wherein the plurality of data instances comprises at least one data instance corresponding to a first category of parameters, at least one data instance corresponding to a second category of parameters, and at least one data instance corresponding to a third category of parameters; train a first prediction model based on the data instances corresponding to the first category of parameters, wherein the first prediction model is configured to provide an output that comprises a first predicted error rate, and wherein the first predicted error rate represents a probability that generating a data report will produce an error based on a parameter in the first category of parameters that is to be included or not included in the data report; train a second prediction model based on the data instances corresponding to the second category of parameters, wherein the second prediction model is configured to provide an output that comprises a second predicted error rate, and wherein the second predicted error rate represents a probability that generating a data report will produce an error based on a parameter in the second category of parameters that is to be included or not included in the data report; train a third prediction model based on the data instances corresponding to the third category of parameters, wherein the third prediction model is configured to provide an output that comprises a third predicted error rate, and wherein the third predicted error rate represents a probability that generating a data report will produce an error based on a parameter in the third category of parameters that is to be included or not included in the data report; train an ensemble machine learning model based on an output of the first prediction model, an output of the second prediction model, and an output of the third prediction model to provide a trained ensemble machine learning model; and generate a runtime output of the trained ensemble machine learning model based on a runtime input, wherein the runtime output comprises a prediction of a total error rate and an indication of a predicted cause of the total error rate based on one or more parameters selected by a user.

Clause 16: The computer program product of clause 15, wherein the one or more instructions further cause the at least one processor to: perform an action based on the runtime output of the trained ensemble machine learning model.

Clause 17: The computer program product of clauses 15 or 16, wherein the one or more instructions that cause the at least one processor to generate a runtime output of the trained ensemble machine learning model cause the at least one processor to: receive a first data instance corresponding to the first category of parameters, wherein the first data instance comprises a plurality of data points, and wherein each data point is an integer representing a first parameter that is selected by the user to be included or not included in the data report; receive a second data instance corresponding to the second category of parameters, wherein the second data instance comprises a plurality of data points, and wherein each data point is an integer representing a second parameter that is selected by the user to be included or not included in the data report; receive a third data instance corresponding to the third category of parameters, wherein the third data instance comprises a plurality of data points, and wherein each data point is an integer representing a third parameter that is selected by the user to be included or not included in the data report; generate a first runtime error rate with the first prediction model based on the first data instance; generate a second runtime error rate with the second prediction model based on the second data instance; generate a third runtime error rate with the third prediction model based on the third data instance; and generate the total error rate and the indication of the predicted cause of the total error rate with the trained ensemble machine learning model based on the first runtime error rate, the second runtime error rate, and the third runtime error rate.

Clause 18: The computer program product of any of clauses 15-17, wherein the first category of parameters is attributes, wherein an attribute is a text string and the at least one data instance corresponding to the first category of parameters comprises a plurality of data points, and wherein each data point is an integer representing the attribute that is to be included or not included in the data report.

Clause 19: The computer program product of any of clauses 15-18, wherein the second category of parameters is metrics, wherein a metric is a numerical value and the at least one data instance corresponding to the second category of parameters comprises a plurality of data points, and wherein each data point is an integer representing the metric that is to be included or not included in the data report.

Clause 20: The computer program product of any of clauses 15-19, wherein the third category of parameters is filters, wherein a filter is a predefined text string or a predefined numerical value, and the at least one data instance corresponding to the third category of parameters comprises a plurality of data points, wherein each data point is an integer equal to 1 or 0, and wherein the integer equal to 1 represents the filter that is included in the data report and the integer equal to 0 represents the filter that is not included in the data report.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which:

FIG. 1 is a diagram of a non-limiting embodiment or aspect of an environment in which systems, devices, products, apparatus, and/or methods, described herein, may be implemented according to the principles of the present disclosure;

DESCRIPTION

Figure 2:
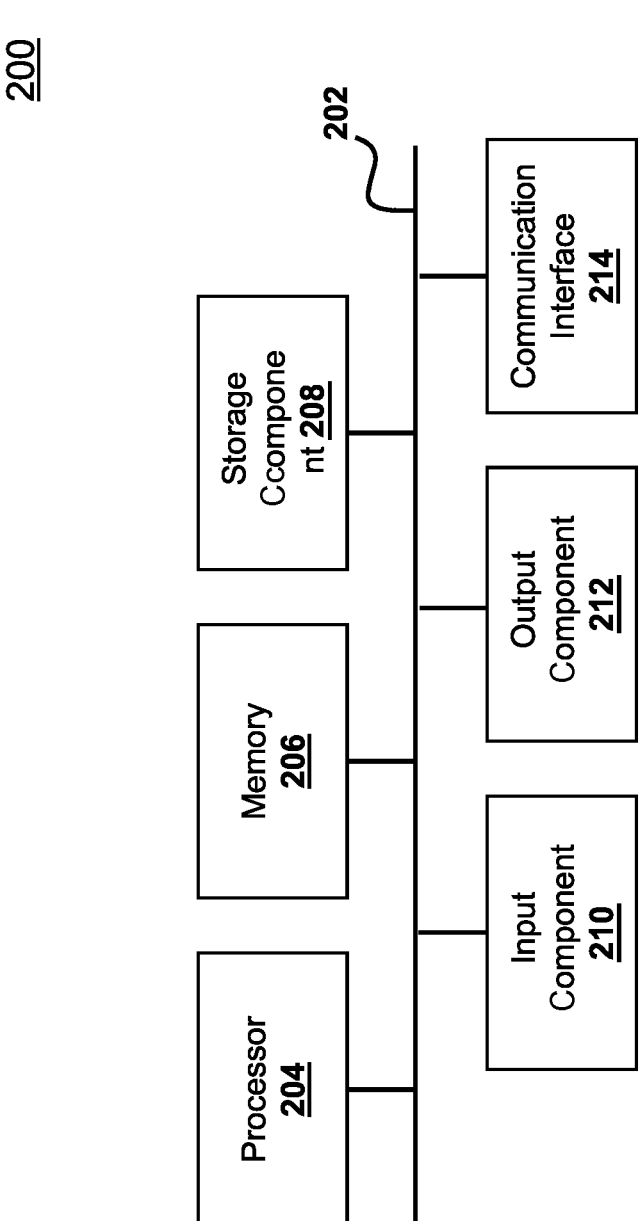
FIG. 2 is a diagram of a non-limiting embodiment or aspect of components of one or more devices and/or one or more systems of FIG. 1.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phrase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network, such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Provided are systems, methods, and computer program products for generating a machine learning model and/or predicting error rates of generating data reports using incremental backpropagation. Embodiments of the present disclosure may include an error rate prediction system for generating an ensemble machine learning model to predict error rates of generating a data report before the data report is executed. In some non-limiting embodiments or aspects, the error rate prediction system may reduce (e.g., eliminate, decrease, and/or the like) time to execute a data report and or provide an error rate of executing the data report before the data report is executed. In some non-limiting embodiments or aspects, the error rate prediction system may receive a dataset of a plurality of data instances, wherein the plurality of data instances comprises at least one data instance corresponding to a first category of parameters, at least one data instance corresponding to a second category of parameters, and at least one data instance corresponding to a third category of parameters. In some non-limiting embodiments or aspects, the error rate prediction system may train a first prediction model based on the data instances corresponding to the first category of parameters, wherein the first prediction model is configured to provide an output that comprises a first predicted error rate, and wherein the first predicted error rate represents a probability that generating a data report will produce an error based on a parameter in the first category of parameters that is to be included or not included in the data report. In some non-limiting embodiments or aspects, the error rate prediction system may train a second prediction model based on the data instances corresponding to the second category of parameters, wherein the second prediction model is configured to provide an output that comprises a second predicted error rate, and wherein the second predicted error rate represents a probability that generating a data report will produce an error based on a parameter in the second category of parameters that is to be included or not included in the data report. In some non-limiting embodiments or aspects, the error rate prediction system may train a third prediction model based on the data instances corresponding to the third category of parameters, wherein the third prediction model is configured to provide an output that comprises a third predicted error rate, and wherein the third predicted error rate represents a probability that generating a data report will produce an error based on a parameter in the third category of parameters that is to be included or not included in the data report. In some non-limiting embodiments or aspects, the error rate prediction system may train an ensemble machine learning model based on an output of the first prediction model, an output of the second prediction model, and an output of the third prediction model to provide a trained ensemble machine learning model. In some non-limiting embodiments or aspects, the error rate prediction system may generate a runtime output of the trained ensemble machine learning model based on a runtime input, wherein the runtime output comprises a prediction of a total error rate and an indication of a predicted cause of the total error rate based on one or more parameters selected by a user.

In some non-limiting embodiments or aspects, the error rate prediction system may perform an action based on the runtime output of the trained ensemble machine learning model. In some non-limiting embodiments or aspects, when receiving the dataset of the plurality of data instances, the error rate prediction system may perform a normalization operation on the plurality of data instances to provide a plurality of normalized data instances, wherein each data instance includes a plurality of data points, and wherein each data point has a value from 0 to 1.

In some non-limiting embodiments or aspects, when generating a runtime output of the trained ensemble machine learning model, the error rate prediction system may receive a first data instance corresponding to the first category of parameters, wherein the first data instance comprises a plurality of data points, and wherein each data point is an integer representing a first parameter that is selected by the user to be included or not included in the data report. In some non-limiting embodiments or aspects, when generating a runtime output of the trained ensemble machine learning model, the error rate prediction system may receive a second data instance corresponding to the second category of parameters, wherein the second data instance comprises a plurality of data points, and wherein each data point is an integer representing a second parameter that is selected by the user to be included or not included in the data report. In some non-limiting embodiments or aspects, when generating a runtime output of the trained ensemble machine learning model, the error rate prediction system may receive a third data instance corresponding to the third category of parameters, wherein the third data instance comprises a plurality of data points, and wherein each data point is an integer representing a third parameter that is selected by the user to be included or not included in the data report. In some non-limiting embodiments or aspects, when generating a runtime output of the trained ensemble machine learning model, the error rate prediction system may generate a first runtime error rate with the first prediction model based on the first data instance. In some non-limiting embodiments or aspects, when generating a runtime output of the trained ensemble machine learning model, the error rate prediction system may generate a second runtime error rate with the second prediction model based on the second data instance. In some non-limiting embodiments or aspects, when generating a runtime output of the trained ensemble machine learning model, the error rate prediction system may generate a third runtime error rate with the third prediction model based on the third data instance. In some non-limiting embodiments or aspects, when generating a runtime output of the trained ensemble machine learning model, the error rate prediction system may generate the total error rate and the indication of the predicted cause of the total error rate with the trained ensemble machine learning model based on the first runtime error rate, the second runtime error rate, and the third runtime error rate.

In some non-limiting embodiments or aspects, the first category of parameters is attributes, wherein an attribute is a text string and the at least one data instance corresponding to the first category of parameters comprises a plurality of data points, and wherein each data point is an integer representing the attribute that is to be included or not included in the data report. In some non-limiting embodiments or aspects, the second category of parameters is metrics, wherein a metric is a numerical value and the at least one data instance corresponding to the second category of parameters comprises a plurality of data points, and wherein each data point is an integer representing the metric that is to be included or not included in the data report.

In some non-limiting embodiments or aspects, the third category of parameters is filters, wherein a filter is a predefined text string or a predefined numerical value, and the at least one data instance corresponding to the third category of parameters comprises a plurality of data points, wherein each data point is an integer equal to 1 or 0, and wherein the integer equal to 1 represents the filter that is included in the data report and the integer equal to 0 represents the filter that is not included in the data report.

In this way, the error rate prediction system may generate a machine learning model that provides an accurate prediction of whether a data report will be successfully generated. For example, the error rate prediction system may generate a machine learning model that provides a prediction of a rate of error that would be encountered by a software data reporting tool that will attempt to generate a data report based on parameters specified by (e.g., selected by) a user. In some non-limiting embodiments or aspects, the error rate prediction system may allow for the user to determine whether errors will be encountered during generation of the data report. For example, the error rate prediction system may allow for the user to determine whether errors will be encountered before one or more SQL queries are executed. Accordingly, the error rate prediction system may reduce the amount of time that the user may have to wait in order to determine whether an error has occurred or will occur. Further, the error rate prediction system may provide the user with a cause of a predicted error that may be encountered if a data report is generated, which may provide the user with insight on how to fix the error.

Referring now to FIG. 1, FIG. 1 is a diagram of an example environment 100 in which devices, systems, methods, and/or products described herein may be implemented. As shown in FIG. 1, environment 100 includes error rate prediction system 102, user device 104, data source 106, and communication network 108. Error rate prediction system 102, user device 104, and data source 106 may interconnect (e.g., establish a connection to communicate, and/or the like) via wired connections, wireless connections, or a combination of wired and wireless connections.

In some non-limiting embodiments or aspects, error rate prediction system 102 may include one or more devices configured to communicate with user device 104, and/or data source 106 via communication network 108. For example, error rate prediction system 102 may include a group of servers and/or other like devices. In some non-limiting embodiments or aspects, error rate prediction system 102 may be associated with (e.g., operated by) a transaction service provider, as described herein. Additionally or alternatively, error rate prediction system 102 may be a component of a transaction service provider system, an issuer system, and/or a merchant system. In some non-limiting embodiments or aspects, error rate prediction system 102 may include one or more machine learning models. The machine learning models may be trained using unsupervised and/or supervised methods. In some non-limiting embodiments or aspects, the machine learning models may be trained using datasets received from data source 106. Additionally or alternatively, the machine learning models may provide a prediction output (e.g., a runtime output) based on testing and/or production datasets received from data source 106. In some non-limiting embodiments or aspects, output from one machine learning model may be used as input for training other machine learning models that are part of error rate prediction system 102.

In some non-limiting embodiments or aspects, user device 104 may include one or more devices configured to communicate with error rate prediction system 102 and/or data source 106 via communication network 108. For example, user device 104 may include a desktop computer (e.g., a client device that communicates with a server), a mobile device, and/or the like. In some non-limiting embodiments or aspects, user device 104 may be associated with a user (e.g., an individual operating a device).

In some non-limiting embodiments or aspects, data source 106 may include one or more devices that includes a dataset used for training one or more machine learning models. In some non-limiting embodiments or aspects, data source 106 may include one or more static training datasets and/or one or more real-time training datasets. For example, data source

106 may include real-time training datasets which may be constantly updated with new data as the new data is collected. In some non-limiting embodiments or aspects, data source 106 may include static training datasets which have been previously compiled and stored in data source 106 (e.g., historical datasets). In some non-limiting embodiments or aspects, static training datasets may be updated with new data over time (e.g., hours, days, months, etc.) and stored for future use.

In some non-limiting embodiments or aspects, data source 106 may be updated with new data via communication network 108. Data source 106 may be configured to communicate with error rate prediction system 102 and/or user device 104 via communication network 108. In some non-limiting embodiments or aspects, data source 106 may be updated with new data from one or more machine learning models. For example, output from one or more machine learning models may be communicated to data source 106 for storage. In some non-limiting embodiments or aspects, output from one or more machine learning models stored in data source 106 may be used as input to one or more separate machine learning models for future training.

In some non-limiting embodiments or aspects, data source 106 may include one or more data sources (e.g., one or more databases, one or more data stores, one or more data warehouses, and/or the like). In some non-limiting embodiments or aspects, data source 106 may be accessed (e.g., queried, and/or the like) using a query language (e.g., structured query language (SQL), and/or the like). Data source 106 may be accessed from user device 104 and/or a separate computing device.

In some non-limiting embodiments or aspects, data source 106 may include one or more datasets (e.g., one or more datasets stored on data source 106). In some non-limiting embodiments or aspects, a dataset may include a training dataset, a testing dataset, a runtime dataset, or any combination thereof. A training dataset may be used as input to one or more machine learning models to train the one or more machine learning models. A testing dataset may be used as input to one or more machine learning models to test the one or more machine learning models. A runtime dataset may be used as input to one or more machine learning models to generate a runtime output of the one or more machine learning models.

In some non-limiting embodiments or aspects, communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 is provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Referring now to FIG. 2, FIG. 2 is a diagram of example components of a device 200. Device 200 may correspond to error rate prediction system 102 (e.g., one or more devices of error rate prediction system 102), user device 104, and/or data source 106. In some non-limiting embodiments or aspects, error rate prediction system 102, user device 104, and/or data source 106 may include at least one device 200. As shown in FIG. 2, device 200 may include bus 202, processor 204, memory 206, storage component 208, input component 210, output component 212, and communication interface 214.

In some non-limiting embodiments or aspects, bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

In some non-limiting embodiments or aspects, storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some non-limiting embodiments or aspects, storage component 208 may be the same as or similar to data source 106.

In some non-limiting embodiments or aspects, input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

In some non-limiting embodiments or aspects, communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

In some non-limiting embodiments or aspects, device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

In some non-limiting embodiments or aspects, software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

In some non-limiting embodiments or aspects, memory 206 and/or storage component 208 may include data storage or one or more data structures (e.g., a database and/or the like). Device 200 may be capable of receiving information from, storing information in, communicating information to, or searching information stored in the data storage or one or more data structures in memory 206 and/or storage component 208. For example, the information may include input data, output data, transaction data, account data, or any combination thereof. In some non-limiting embodiments or aspects, memory 206 and/or storage component 208 may be the same as or similar to data source 106.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
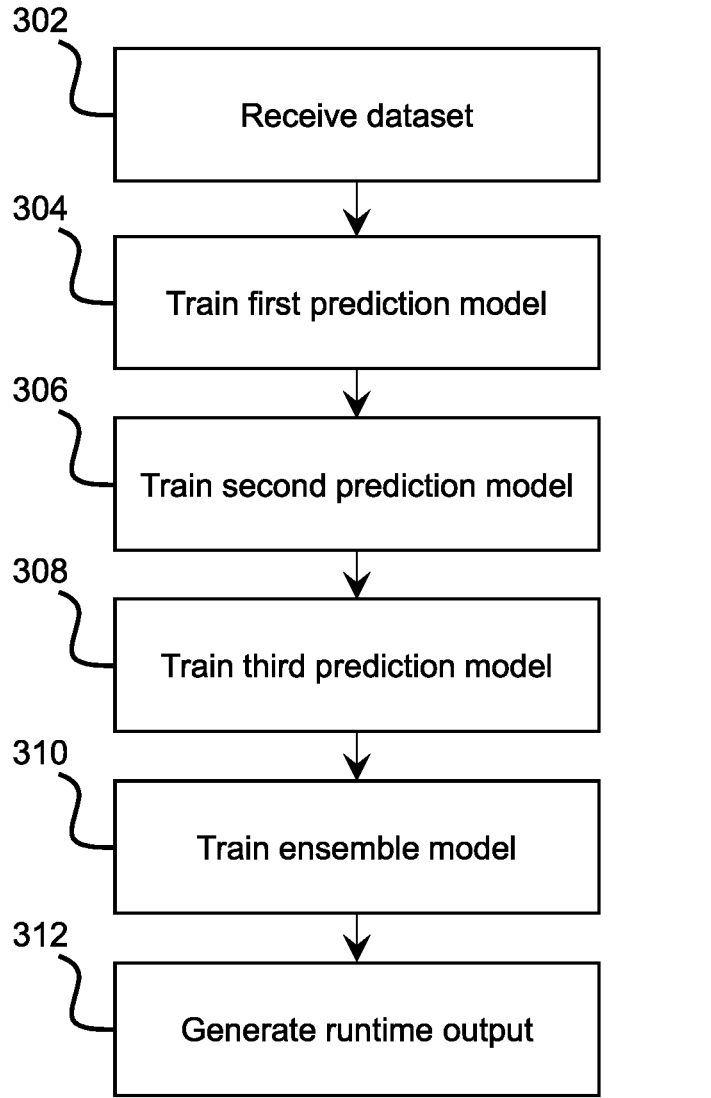
FIG. 3 is a flowchart of a non-limiting embodiment or aspect of a process for generating an error rate prediction of a data report based on a trained machine learning model using incremental backpropagation.

Referring now to FIG. 3, FIG. 3 is a flowchart of a non-limiting embodiment or aspect of a process 300 for generating an error rate prediction of a data report based on a trained machine learning model using incremental back-propagation. In some non-limiting embodiments or aspects, one or more of the functions described with respect to process 300 may be performed (e.g., completely, partially, etc.) by error rate prediction system 102. In some non-limiting embodiments or aspects, one or more of the steps of process 300 may be performed (e.g., completely, partially, and/or the like) by another device or a group of devices separate from or including error rate prediction system 102, such as user device 104. In some non-limiting embodiments or aspects, one or more of the steps of process 300 may be performed during a training phase. In some non-limiting embodiments or aspects, the training phase may include an environment where a machine learning model, such as a prediction model, is being trained (e.g., in a training environment, model building phase, and/or the like). In some non-limiting embodiments or aspects, one or more of the steps of process 300 may be performed during a testing phase. In some non-limiting embodiments or aspects, the testing phase may include an environment where a machine learning model, such as a prediction model, is being tested (e.g., in a testing environment, model evaluation, model validation, and/or the like). In some non-limiting embodiments or aspects, one or more of the steps of process 300 may be performed during a runtime phase. In some non-limiting embodiments or aspects, the runtime phase may include an environment where a machine learning model, such as a prediction model, is executing in runtime (e.g., in a runtime and/or production environment, generating a prediction, and/or the like).

As shown in FIG. 3, at step 302, process 300 may include receiving a dataset. For example, error rate prediction system 102 may receive the dataset and provide the dataset as input to one or more machine learning models. For example, error rate prediction system 102 may receive a dataset from data source 106 for training one or more machine learning models, testing one or more machine learning models, and/or generating a runtime output using one or more machine learning models.

In some non-limiting embodiments or aspects, error rate prediction system 102 may receive a dataset in real-time with respect to the data instances being collected. In some non-limiting embodiments or aspects, error rate prediction system 102 may receive a dataset corresponding to input provided by a user. For example, error rate prediction system 102 may receive a dataset corresponding to input provided by the user from user device 104. In some non-limiting embodiments or aspects, error rate prediction system 102 may receive a dataset corresponding to a plurality of inputs provided by a plurality of users. In some non-limiting embodiments or aspects, the input provided by the user may include one or more parameters selected by the user (e.g., user report input). In some non-limiting embodiments or aspects, the parameters selected by the user may correspond to parameters to be included in a data report (e.g., a data report generated by executing a data reporting system, such as MicroStrategy®, with one or more parameters selected by a user).

In some non-limiting embodiments or aspects, the collection of input provided (e.g., selected parameters) by a user in a single instance with respect to generating a data report may be referred to as a user report input. For example, a user may select a first plurality of parameters (e.g., attributes, metrics, filters, and/or the like) for generating a first data report. This may be referred to as a first user report input (e.g., the collection of parameters selected by a user and other inputs selected by a user to execute a single data report). In some non-limiting embodiments or aspects, a user report input may include one or more parameters selected by a user for generating a data report.

In some non-limiting embodiments or aspects, error rate prediction system 102 may receive a dataset of a plurality of data instances. In some non-limiting embodiments or aspects, the plurality of data instances may include at least one data instance corresponding to a first category of parameters. In some non-limiting embodiments or aspects, the plurality of data instances may include at least one data instance corresponding to a second category of parameters. In some non-limiting embodiments or aspects, the plurality of data instances may include at least one data instance corresponding to a third category of parameters. For example, the plurality of data instances may include at least one data instance corresponding to an attribute parameter, a metric parameter, and/or a filter parameter. In some non-limiting embodiments or aspects, each data instance of the plurality of data instances may include one or more data points. In some non-limiting embodiments or aspects, each data point in the data instance may correspond to a parameter in the category of parameters (e.g., the same category of parameters as the data instance).

In some non-limiting embodiments or aspects, each data instance of the plurality of data instances may be associated with a user report input (e.g., the collection of parameters selected by a user to be included in a data report generated by error rate prediction system 102 and/or a data reporting system, such as MicroStrategy®). For example, a user may use a data reporting system to generate a data report. When the user makes selections (e.g., selecting parameters and/or options for generating the data report), the selections may be represented by and/or translated into a format such that the user report input may be stored (e.g., stored in one or more data instances). A user may select one or more parameters using the data reporting system. In some instances, the user's selection of parameters may be represented as and/or translated to a data representation to be stored in a data instance. In some non-limiting embodiments or aspects, the user's selection of parameters may be represented as integers. For example, the user's selection of a first parameter may be stored in a data point of the data instance corresponding to the first category of parameters as an integer representing the selection. In this way, each data instance of the plurality of data instances may be associated with a user report input.

In some non-limiting embodiments or aspects, at least one data instance of the plurality of data instances may correspond to a first category of parameters. In some non-limiting embodiments or aspects, the first category of parameters may include attributes. In some non-limiting embodiments or aspects, an attribute may have a data type of string (e.g., text string, alphanumeric string, a sequence of characters, and/or the like). In some non-limiting embodiments or aspects, an attribute may include employee name, product name, company, merchant, state, country, region, and/or the like. For example, an attribute may include "merchants."

In some non-limiting embodiments or aspects, an attribute may be associated with one or more attribute values. In some non-limiting embodiments or aspects, an attribute value may have a data type of string (e.g., text string, alphanumeric string, a sequence of characters, and/or the like). In some non-limiting embodiments or aspects, an attribute may have a data type the same as or different from the data type of the one or more attribute values it is associated with. For example, an attribute having a data type of string may be associated with one or more attribute values each having a data type of string. An attribute of "country" may be associated with one or more attribute values having a data type of string including "India", "United States", "Australia", and/or the like. As a further example, an attribute of "merchant" may be associated with one or more attribute values having a data type of string including "Walmart®", "Amazon®", "Target®", and/or the like. In the context of a data report, an attribute (and/or the attribute values associated with the attribute) may provide a label for numerical data.

In some non-limiting embodiments or aspects, each data point in the at least one data instance corresponding to the first category of parameters may correspond to a parameter in the first category of parameters (e.g., attributes). For example, the first data point in the at least one data instance may correspond to a first attribute, the second data point in the at least one data instance may correspond to a second attribute, etc. In some non-limiting embodiments or aspects, the number of data points in the at least one data instance may be equal to the number of parameters in the first category of parameters.

In some non-limiting embodiments or aspects, each data point may represent a parameter available to be selected or not selected by a user. In some non-limiting embodiments or aspects, each data point in the at least one data instance corresponding to the first category of parameters may represent a parameter in the first category of parameters (e.g., attributes) selected or not selected by a user. In some non-limiting embodiments or aspects, each data point in the at least one data instance may include an integer (e.g., the value of the data point may include an integer value). For example, the first data point in the data instance may include the integer "0", the second data point in the data instance may include the integer "1", the third data point in the data instance may include the integer "−1", the fourth data point in the data instance may include the integer "6", etc. Each data point in the data instance may include any integer and the data points are not limited to include −1, 0, 1, and/or 6.

In some non-limiting embodiments or aspects, the integer included in a data point of a data instance may represent a parameter in the first category of parameters (e.g., attributes) that was selected or not selected by a user based on the user report input associated with the data instance. In some non-limiting embodiments or aspects, the integer may include "0." In some non-limiting embodiments or aspects, an integer of "O" may represent that a parameter was selected by a user for display only. For example, the first data point in the data instance may include the integer "0." The integer "0" included in the first data point may represent that a first attribute was selected by a user based on the user report input (e.g., the first attribute may be included in the data report) without any attribute filters applied to the first attribute (e.g., the data report that is generated will display all attribute values associated with the first attribute, and no attribute filters will be applied to the attribute values when generating the data report).

As a further example, the first data point in the data instance may correspond to a first attribute where the first attribute includes "merchant" (e.g., the first attribute is associated with attribute values representing merchants). Accordingly, the first data point including the integer of "0" may represent that the attribute "merchant" was selected by a user to be included in the data report such that all attribute values associated with merchants (e.g., text strings representing merchants) would be displayed in the data report (e.g., all attribute values associated with the attribute "merchant" available in data source 106 would be fetched and displayed in the data report, such as "Walmart®", "Amazon®", "Target®", etc.).

In some non-limiting embodiments or aspects, the integer may include an integer that is not "0" or "−1" (e.g., "1", "2", "3", etc.). In some non-limiting embodiments or aspects, an integer that is not "0" or "−1" may represent that a parameter was selected by a user with a number of filters applied. In some non-limiting embodiments or aspects, the value of the integer may correspond to the number of filters that may be applied to the parameter based on the user report input. For example, the second data point in the data instance corresponding to the first category of parameters (e.g., attributes) may include the integer "3." The integer "3" included in the second data point may represent that a second attribute was selected by a user based on the user report input (e.g., the second attribute may be included in the data report) with three attribute filters applied to the second attribute (e.g., the data report that is generated applies three attribute filters to the collection of attribute values when generating the data report to display three attribute values associated with the second attribute).

As a further example, the second data point in the data instance may correspond to a second attribute where the second attribute includes "merchant" (e.g., the second attribute is associated with attribute values representing merchants). Accordingly, the second data point including the integer of "3" may represent that the attribute "merchant" was selected by a user to be included in the data report such that three attribute values associated with merchants (e.g., text strings representing merchants) would be displayed and/or included in the data report based on three attribute filters included in the user report input (e.g., three attribute values associated with the attribute "merchant" available in data source 106 would be fetched and displayed in the data report based on the attribute filters selected by the user and included in the user report input). For example, the user may have selected three merchants in the user report input, such as "Walmart®", "Amazon®", and "Target®." Only "Walmart®", "Amazon®", and "Target®" would be included in the data report.

In some non-limiting embodiments or aspects, an attribute filter may refer to a selection available to the user which, when selected by the user, may act on all attribute values of an associated attribute (e.g., the first attribute) to include or not include attribute values of the associated attribute in the data report. For example, if the user selects the first attribute to be "country", the attribute values associated with the first attribute of "country" may include "United States", "India", "Canada", and a number of other countries. The user may select an attribute filter to be applied which only includes the attribute values "United States" and "Canada" in the report. In this instance, all other attribute values (e.g., "India", "China", "Brazil", etc.) would not be included in the data report.

In some non-limiting embodiments or aspects, the integer included in a data point of a data instance may represent a parameter in the first category of parameters (e.g., attributes) that is to be included or not included in a data report (e.g., a parameter that was selected or not selected by a user based on the user report input). For example, a data point in the data instance may include an integer of "−1." An integer of "−1" may represent that a parameter was not selected by the user to be included in the data report based on the user report input. In some non-limiting embodiments or aspects, an integer of "−1" may represent that the parameter is not to be included in the data report.

In some non-limiting embodiments or aspects, at least one data instance of the plurality of data instances may correspond to a second category of parameters. In some non-limiting embodiments or aspects, the second category of parameters may include metrics. In some non-limiting embodiments or aspects, a metric may have a data type of string (e.g., text string, alphanumeric string, a sequence of characters, and/or the like). In some non-limiting embodiments or aspects, a metric may include sales amount, transaction volume, revenue, profit, percent of all revenue by product, and/or the like. For example, a metric may include "revenue."

In some non-limiting embodiments or aspects, a metric may be associated with one or more metric values. In some non-limiting embodiments or aspects, a metric value may be associated with an attribute value. In some non-limiting embodiments or aspects, a metric value may have a data type of numeric (e.g., integer, number, real, floating point, currency, and/or the like). In some non-limiting embodiments or aspects, a metric may have a data type the same as or different from the data type of the one or more metric values it is associated with. For example, a metric having a data type of string may be associated with one or more metric values each having a data type of numeric. A metric of "revenue" may be associated with one or more metric values having a data type of numeric including "$3,135,283", "0.01%", "$5.99", and/or the like. As a further example, a metric of "sales amount" may be associated with one or more metric values having a data type of numeric including "3000", "$2000", "500", and/or the like. In the context of a data report, a metric (and/or the metric values associated with the metric) may provide a result for each attribute value that is displayed and/or included in the data report.

In some non-limiting embodiments or aspects, each data point in the at least one data instance corresponding to the second category of parameters may correspond to a parameter in the second category of parameters (e.g., metrics). For example, the first data point in the at least one data instance may correspond to a first metric, the second data point in the at least one data instance may correspond to a second metric, etc. In some non-limiting embodiments or aspects, the number of data points in the at least one data instance may be equal to the number of parameters in the second category of parameters.

In some non-limiting embodiments or aspects, each data point may represent a parameter available to be selected or not selected by a user. In some non-limiting embodiments or aspects, each data point in the at least one data instance corresponding to the second category of parameters may represent a parameter in the second category of parameters (e.g., metrics) selected or not selected by a user. In some non-limiting embodiments or aspects, each data point in the at least one data instance may include an integer (e.g., the value of the data point may include an integer value). For example, the first data point in the data instance may include the integer "0", the second data point in the data instance may include the integer "1", the third data point in the data instance may include the integer "−1", etc. Each data point in the data instance may include any integer and the data points are not limited to include −1, 0, and/or 1.

In some non-limiting embodiments or aspects, the integer included in a data point of a data instance may represent a parameter in the second category of parameters (e.g., metrics) that was selected or not selected by a user based on the user report input associated with the data instance. In some non-limiting embodiments or aspects, the integer may include "0." In some non-limiting embodiments or aspects, an integer of "0" may represent that a parameter was selected by a user for display only. For example, the first data point in the data instance may include the integer "0." The integer "0" included in the first data point may represent that a first metric was selected by a user based on the user report input (e.g., the first attribute may be included in the data report) without any filters applied to the first metric (e.g., the data report that is generated will display all metric values associated with the first metric, and no filters will be applied to the metric values when generating the data report).

As a further example, the first data point in the data instance may correspond to a first metric where the first metric includes "transaction count" (e.g., the first metric is associated with metric values representing transaction counts). Accordingly, the first data point including the integer of "0" may represent that the metric "transaction count" was selected by a user to be included in the data report such that all metric values associated with transaction count and associated with attribute values (e.g., numeric values representing transaction counts associated with attribute values) would be displayed in the data report (e.g., all metric values associated with the metric "transaction count" available in data source 106 and corresponding to the attribute values that were selected based on the user report input would be fetched and displayed in the data report, such as "465", "2000", "3500", etc.). In some non-limiting embodiments or aspects, each metric may correspond to an attribute and each metric value may be associated with at least one attribute value. For example, if the user report input includes a first attribute of "merchant" and a first metric of "transaction count," the generated data report may include a row including a merchant "Amazon®" and a transaction count of "5000."

In some non-limiting embodiments or aspects, the integer may include an integer of "1." In some non-limiting embodiments or aspects, an integer of "1" may represent that a parameter was selected by a user with at least one filter applied. For example, the second data point in the data instance corresponding to the second category of parameters (e.g., metrics) may include the integer "1." The integer "1" included in the second data point may represent that a second metric was selected with a first filter selected by a user based on the user report input (e.g., the second metric may be included in the data report with a first filter). In this instance, the data report that is generated applies at least one filter to the collection of metric values when generating the data report to display metric values associated with the second metric that correspond to the first filter that was selected by the user.

As a further example, the second data point in the data instance may correspond to a second metric where the second metric includes "transaction count" (e.g., the second metric is associated with metric values representing transaction counts). Accordingly, the second data point in the data instance corresponding to the second category of parameters including the integer of "1" may represent that the metric "transaction count" was selected by a user to be included in the data report such that a filter associated with transaction counts would be applied to the metric values. For example, the user may have selected a filter in the user report input, such as "greater than 4500." In this instance, only metric values that are greater than 4500 would be included in the data report.

In some non-limiting embodiments or aspects, the integer included in a data point of a data instance may represent a parameter in the second category of parameters (e.g., metrics) that is to be included or not included in a data report (e.g., a parameter that was selected or not selected by a user based on the user report input). For example, a data point in the data instance may include an integer of "−1." An integer of "−1" may represent that a parameter was not selected by the user to be included in the data report based on the user report input. In some non-limiting embodiments or aspects, an integer of "−1" may represent that the parameter is not to be included in the data report.

In some non-limiting embodiments or aspects, a filter may refer to a selection available to the user which, when selected by the user, may act on all attribute values and/or metric values of an associated user report input. In some non-limiting embodiments or aspects, a filter may specify to include or not include attribute values and/or metric values of the associated user report input in the data report. In some non-limiting embodiments or aspects, a filter may be selected by a user to apply to metric values. For example, a filter may be applied only to metric values and may include a selection of metric values "less than 4000." In the case where the metric that was selected by the user includes "transaction count", the applied filter would include metric values which are less than 4000 and would not include metric values which are greater than 4000 in the data report.

In some non-limiting embodiments or aspects, a filter may be predefined based on one or more criterion for attributes and/or one or more criterion for metrics. For example, if the user selects the first attribute to be "merchant", the attribute values associated with the first attribute of "merchant" may include "Walmart®", "Amazon®", "Target®", and a number of other merchants. The user may select a metric of transaction volume. The user may select a filter to be applied which includes the top six merchants. The filter may be predefined in such a manner that the criterion used to determine which merchants are "top six" may have been defined by a user (e.g., the user may have predefined the filter to include merchants with greater than $3,000,000 in revenue, a transaction count greater than 10,000, and the user may have limited the results to six merchants).

In some non-limiting embodiments or aspects, at least one data instance of the plurality of data instances may correspond to a third category of parameters. In some non-limiting embodiments or aspects, the third category of parameters may include filters. In some non-limiting embodiments or aspects, a filter may have a Boolean data type (e.g., the filter is selected or not selected by a user). In some non-limiting embodiments or aspects, a filter may include a range, a category, and/or the like. For example, a filter may include a date range (e.g., from January 2019 to January 2021), a sales amount (e.g., sales amount greater than $3,000), and/or a category of employees (e.g., employee names starting with the letter "P"). In some non-limiting embodiments or aspects, a filter may be based on a parameter, such as an attribute and/or a metric (e.g., a filter may be based on employee name and/or sales amount).

In some non-limiting embodiments or aspects, filters may be predefined by a user. In some non-limiting embodiments or aspects, a user may predefine a filter by selecting one or more parameters (e.g., attribute, metric, etc.) that the filter will be based on. For example, a user may predefine a filter by creating a filter including a date range (e.g., January-March 2021) and a revenue amount (e.g., revenue greater than $1 billion). This filter may be applied to an attribute (such as "merchant") to filter data in a data report such that the generated data report will display merchants that had revenue greater than $1 billion in January-March 2021.

In some non-limiting embodiments or aspects, each data point in the at least one data instance corresponding to the third category of parameters may correspond to a parameter in the third category of parameters (e.g., filters). For example, the first data point in the at least one data instance may correspond to a first filter, the second data point in the at least one data instance may correspond to a second filter, etc. In some non-limiting embodiments or aspects, the number of data points in the at least one data instance may be equal to the number of parameters in the third category of parameters.

In some non-limiting embodiments or aspects, each data point may represent a parameter available to be selected or not selected by a user. In some non-limiting embodiments or aspects, each data point in the at least one data instance corresponding to the third category of parameters may represent a parameter in the third category of parameters (e.g., filters) selected or not selected by a user. In some non-limiting embodiments or aspects, each data point in the at least one data instance may include an integer (e.g., the value of the data point may include an integer value). For example, the first data point in the data instance may include the integer "0", the second data point in the data instance may include the integer "1", the third data point in the data instance may include the integer "0", etc. In some non-limiting embodiments or aspects, each data point in the at least one data instance corresponding to the category of parameters that includes filters may include either an integer value of "1" or "0."

In some non-limiting embodiments or aspects, the integer included in a data point of a data instance may represent a parameter in the third category of parameters (e.g., filters) that was selected or not selected by a user based on the user report input associated with the data instance. For example, a data point in the data instance may include an integer of "1." An integer of "1" may represent that a parameter was selected by the user to be included in the data report based on the user report input. In some non-limiting embodiments or aspects, an integer of "0" may represent that the parameter is not to be included in the data report. In some non-limiting embodiments or aspects, the integer may represent the attribute that is to be included or not included in a data report.

In some non-limiting embodiments or aspects, the integer included in a data point of a data instance may represent a parameter in the third category of parameters (e.g., filters) that was selected or not selected by a user based on the user report input associated with the data instance. In some non-limiting embodiments or aspects, the integer may include "0." In some non-limiting embodiments or aspects, an integer of "0" may represent that a parameter was not selected by a user. For example, the first data point in the data instance may include the integer "0." The integer "0" included in the first data point may represent that a first filter was not selected by a user based on the user report input (e.g., the first filter may not be included in the data report).

In some non-limiting embodiments or aspects, the integer may include an integer of "1." In some non-limiting embodiments or aspects, an integer of "1" may represent that a parameter was selected by a user based on the user report input associated with the data instance. For example, the second data point in the data instance corresponding to the third category of parameters (e.g., filters) may include the integer "1." The integer "1" included in the second data point may represent that a second filter was selected by a user based on the user report input (e.g., the second filter may be included in the data report). In this instance, the data report that is generated applies the second filter when generating the data report.

With respect to the dataset of the plurality of data instances, in some non-limiting embodiments or aspects, the dataset may be generated based on one or more user report inputs. In some non-limiting embodiments or aspects, the plurality of data instances may be associated with one or more user report inputs. In some non-limiting embodiments or aspects, the at least one data instance corresponding to the first category of parameters, the at least one data instance corresponding to the second category of parameters, and the at least one data instance corresponding to the third category of parameters may be generated based on the same user report input. In some non-limiting embodiments or aspects, the plurality of data instances generated based on the same user report input may be associated with one another. For example, the at least one data instance corresponding to the first category of parameters, the at least one data instance corresponding to the second category of parameters, and the at least one data instance corresponding to the third category of parameters may relate to one another in that they were generated based on the same user report input for the generation of a data report.

In some non-limiting embodiments or aspects, error rate prediction system 102 may perform a normalization operation on the plurality of data instances after receiving the dataset of the plurality of data instances. In some non-limiting embodiments or aspects, error rate prediction system 102 may provide a plurality of normalized data instances based on performing the normalization operation. For example, error rate prediction system 102 may perform a normalization operation on the plurality of data instances using min-max scaling (e.g., min-max normalization). In some non-limiting embodiments or aspects, each normalized data instance may include one or more data points. In some non-limiting embodiments or aspects, each data point may include a value from 0 to 1 based on the normalization operation.

With continued reference to FIG. 3, at step 304, process 300 may include training a first prediction model. For example, error rate prediction system 102 may train the first prediction model based on the data instances corresponding to the first category of parameters. In some non-limiting embodiments or aspects, the first prediction model may be configured to provide an output that includes a first predicted error rate. In some non-limiting embodiments or aspects, the first predicted error rate may represent a probability that generating a data report (e.g., generating a data report based on a user report input) will produce an error. In some non-limiting embodiments or aspects, the first predicted error rate may be based on a parameter in the first category of parameters that is to be included or not included in the data report. For example, the first predicted error rate may represent a probability that generating a data report will produce an error based on an attribute that is to be included or not included (e.g., selected or not selected by a user) in the data report.

As shown in FIG. 3, at step 306, process 300 may include training a second prediction model. For example, error rate prediction system 102 may train the second prediction model based on the data instances corresponding to the second category of parameters. In some non-limiting embodiments or aspects, the second prediction model may be configured to provide an output that includes a second predicted error rate. In some non-limiting embodiments or aspects, the second predicted error rate may represent a probability that generating a data report (e.g., generating a data report based on a user report input) will produce an error. In some non-limiting embodiments or aspects, the second predicted error rate may be based on a parameter in the second category of parameters that is to be included or not included in the data report. For example, the second predicted error rate may represent a probability that generating a data report will produce an error based on a metric that is to be included or not included (e.g., selected or not selected by a user) in the data report.

As shown in FIG. 3, at step 308, process 300 may include training a third prediction model. For example, error rate prediction system 102 may train a third prediction model based on the data instances corresponding to the third category of parameters. In some non-limiting embodiments or aspects, the third prediction model may be configured to provide an output that includes a third predicted error rate. In some non-limiting embodiments or aspects, the third predicted error rate may represent a probability that generating a data report (e.g., generating a data report based on a user report input) will produce an error. In some non-limiting embodiments or aspects, the third predicted error rate may be based on a parameter in the third category of parameters that is to be included or not included in the data report. For example, the third predicted error rate may represent a probability that generating a data report will produce an error based on a filter that is to be included or not included (e.g., selected or not selected by a user) in the data report.

As shown in FIG. 3, at step 310, process 300 may include training an ensemble model. For example, error rate prediction system 102 may train an ensemble machine learning model based on an output of the first prediction model, an output of the second prediction model, and/or an output of the third prediction model. In some non-limiting embodiments or aspects, error rate prediction system 102 may train the ensemble machine learning model to provide a trained ensemble machine learning model.

In some non-limiting embodiments, the ensemble machine learning model (e.g., the trained ensemble machine learning model) may be configured to provide an output, where the output includes a prediction of total error rate (e.g., a total predicted error rate) and/or an indication of a predicted cause of the total error rate. In some non-limiting embodiments, the prediction of total error rate includes a prediction of a probability that an error will occur during generation of a data report based on one or more parameters selected by a user (e.g., a user report input) for generation of the data report. In some non-limiting embodiments or aspects, the indication of the predicted cause of the total error rate may include an indication of a reason that an error will occur during generation of the data report based on one or more parameters selected by the user.

As shown in FIG. 3, at step 312, process 300 may include generating a runtime output. For example, error rate prediction system 102 may generate a runtime output of the trained ensemble machine learning model. In some non-limiting embodiments or aspects, error rate prediction system 102 may generate the runtime output based on a runtime input. In some non-limiting embodiments or aspects, the runtime output may include a prediction of a total error rate. In some non-limiting embodiments or aspects, the runtime output may include an indication of a predicted cause of the total error rate. In some non-limiting embodiments or aspects, the runtime input may include a user report input.

In some non-limiting embodiments or aspects, when generating a runtime output of the trained ensemble machine learning model, error rate prediction system 102 may receive a first data instance corresponding to the first category of parameters. In some non-limiting embodiments or aspects, the first data instance may include a plurality of data points. In some non-limiting embodiments or aspects, each data point may include an integer. In some non-limiting embodiments or aspects, the integer may represent a first parameter that is selected by a user to be included or not included in the data report (e.g., the integer may represent a selection of a user included in a user report input).

In some non-limiting embodiments or aspects, when generating a runtime output of the trained ensemble machine learning model, error rate prediction system 102 may receive a second data instance corresponding to the second category of parameters. In some non-limiting embodiments or aspects, the second data instance may include a plurality of data points. In some non-limiting embodiments or aspects, each data point may include an integer. In some non-limiting embodiments or aspects, the integer may represent a second parameter that is selected by the user to be included or not included in the data report.

In some non-limiting embodiments or aspects, when generating a runtime output of the trained ensemble machine learning model, error rate prediction system 102 may receive a third data instance corresponding to the third category of parameters. In some non-limiting embodiments or aspects, the third data instance may include a plurality of data points. In some non-limiting embodiments or aspects, each data point may include an integer. In some non-limiting embodiments or aspects, the integer may represent a third parameter that is selected by the user to be included or not included in the data report.

In some non-limiting embodiments or aspects, when generating a runtime output of the trained ensemble machine learning model, error rate prediction system 102 may generate a first runtime error rate with the first prediction model. In some non-limiting embodiments or aspects, error rate prediction system 102 may generate the first runtime error rate based on the first data instance.

In some non-limiting embodiments or aspects, when generating a runtime output of the trained ensemble machine learning model, error rate prediction system 102 may generate a second runtime error rate with the second prediction model. In some non-limiting embodiments or aspects, error rate prediction system 102 may generate the second runtime error rate based on the second data instance.

In some non-limiting embodiments or aspects, when generating a runtime output of the trained ensemble machine learning model, error rate prediction system 102 may generate a third runtime error rate with the second prediction model. In some non-limiting embodiments or aspects, error rate prediction system 102 may generate the third runtime error rate based on the third data instance.

In some non-limiting embodiments or aspects, when generating a runtime output of the trained ensemble machine learning model, error rate prediction system 102 may generate the total error rate and the indication of a predicted cause of the total error rate with the trained ensemble machine learning model. In some non-limiting embodiments or aspects, error rate prediction system 102 may generate the total error rate and the indication of a predicted cause of the total error rate based on the first runtime error rate, the second runtime error rate, and the third runtime error rate.

In some non-limiting embodiments or aspects, error rate prediction system 102 may perform an action based on the runtime output of the trained ensemble machine learning model. For example, error rate prediction system 102 may cause a data reporting system to generate or not generate a data report using the runtime input (e.g., a user report input) based on the total error rate satisfying or not satisfying a threshold.

Referring now to FIGS. 4A-4F, FIGS. 4A-4F are diagrams of non-limiting embodiments or aspects of an implementation 400 of a process (e.g., process 300) for generating an error rate prediction of a data report based on a trained machine learning model using incremental backpropagation.

Figure 4A:
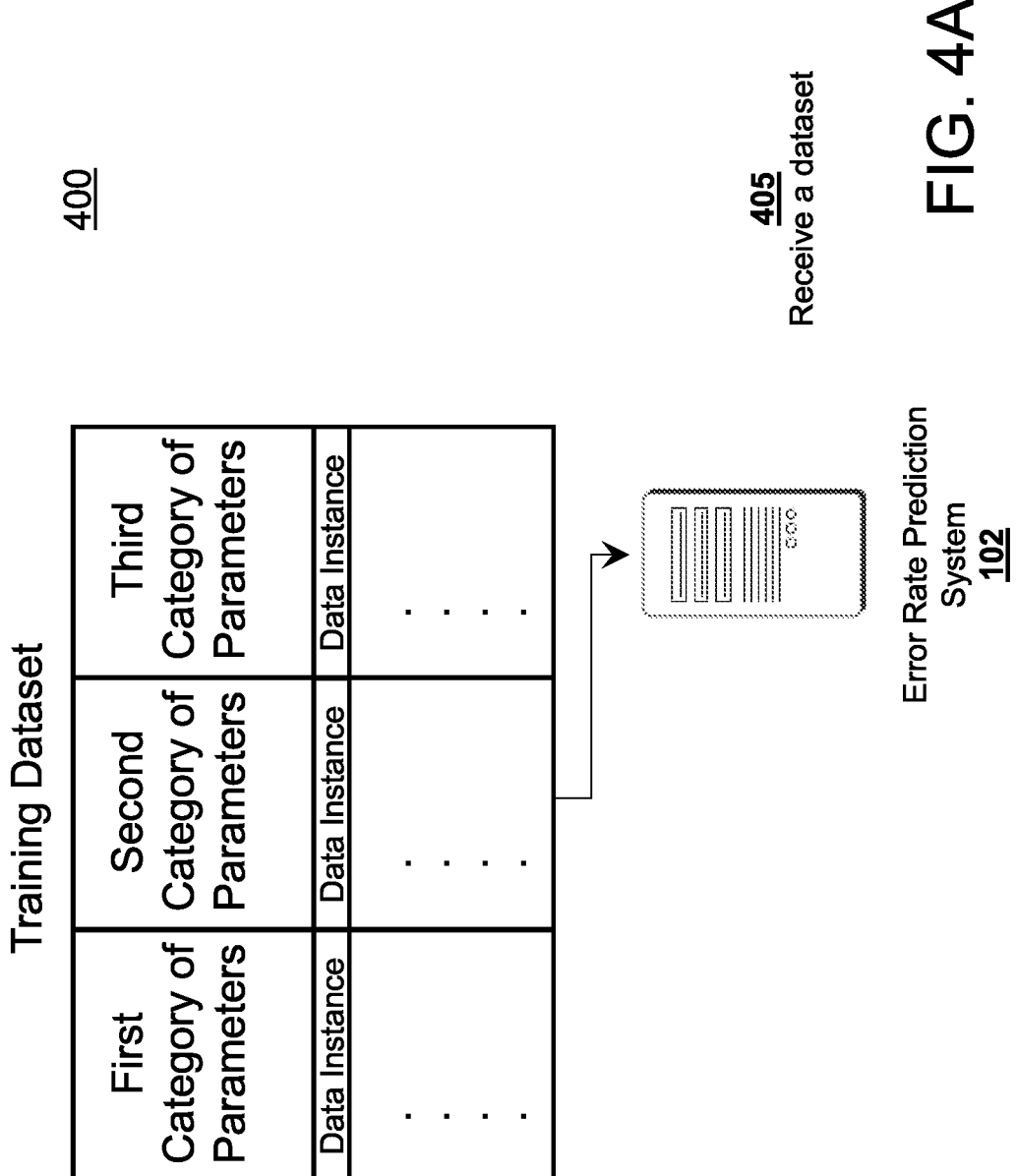
FIGS. 4A-4F are diagrams of non-limiting embodiments or aspects of an implementation of a process for generating an error rate prediction of a data report based on a trained machine learning model using incremental backpropagation.

As shown by reference number 405 in FIG. 4A, error rate prediction system 102 may receive a dataset. In some non-limiting embodiments or aspects, error rate prediction system 102 may receive a dataset of a plurality of data instances. In some non-limiting embodiments or aspects, the plurality of data instances may include at least one data instance corresponding to a first category of parameters, at least one data instance corresponding to a second category of parameters, and at least one data instance corresponding to a third category of parameters.

In some non-limiting embodiments or aspects, error rate prediction system 102 may receive a dataset in real-time with respect to the data instances being collected. In some non-limiting embodiments or aspects, error rate prediction system 102 may receive a dataset corresponding to input provided by a user. For example, error rate prediction system 102 may receive a dataset corresponding to input provided by the user from user device 104. In some non-limiting embodiments or aspects, error rate prediction system 102 may receive a dataset corresponding to a plurality of inputs provided by a plurality of users. In some non-limiting embodiments or aspects, the input provided by the user may include the plurality of data instances. In some non-limiting embodiments or aspects, the plurality of data instances may be generated based on the user input (e.g., a user input report). In some non-limiting embodiments or aspects, a user may input a plurality of selections of parameters where at least one data instance corresponds to each category of parameters in a single instance (e.g., the user report input). In some non-limiting embodiments or aspects, each data instance may include data points representing parameters selected by the user. In some non-limiting embodiments or aspects, the parameters selected by the user may correspond to parameters to be included in a data report (e.g., a data report generated by executing a data reporting system, such as MicroStrategy®, with one or more parameters selected by a user).

In some non-limiting embodiments or aspects, error rate prediction system 102 may perform a normalization operation on the plurality of data instances after receiving the dataset of the plurality of data instances. In some non-limiting embodiments or aspects, error rate prediction system 102 may provide a plurality of normalized data instances based on performing the normalization operation. For example, error rate prediction system 102 may perform a normalization operation on the plurality of data instances using min-max scaling (e.g., min-max normalization). In some non-limiting embodiments or aspects, each normalized data instance may include one or more data points. In some non-limiting embodiments or aspects, each data point may include a value from 0 to 1 based on the normalization operation.

Figure 4B:
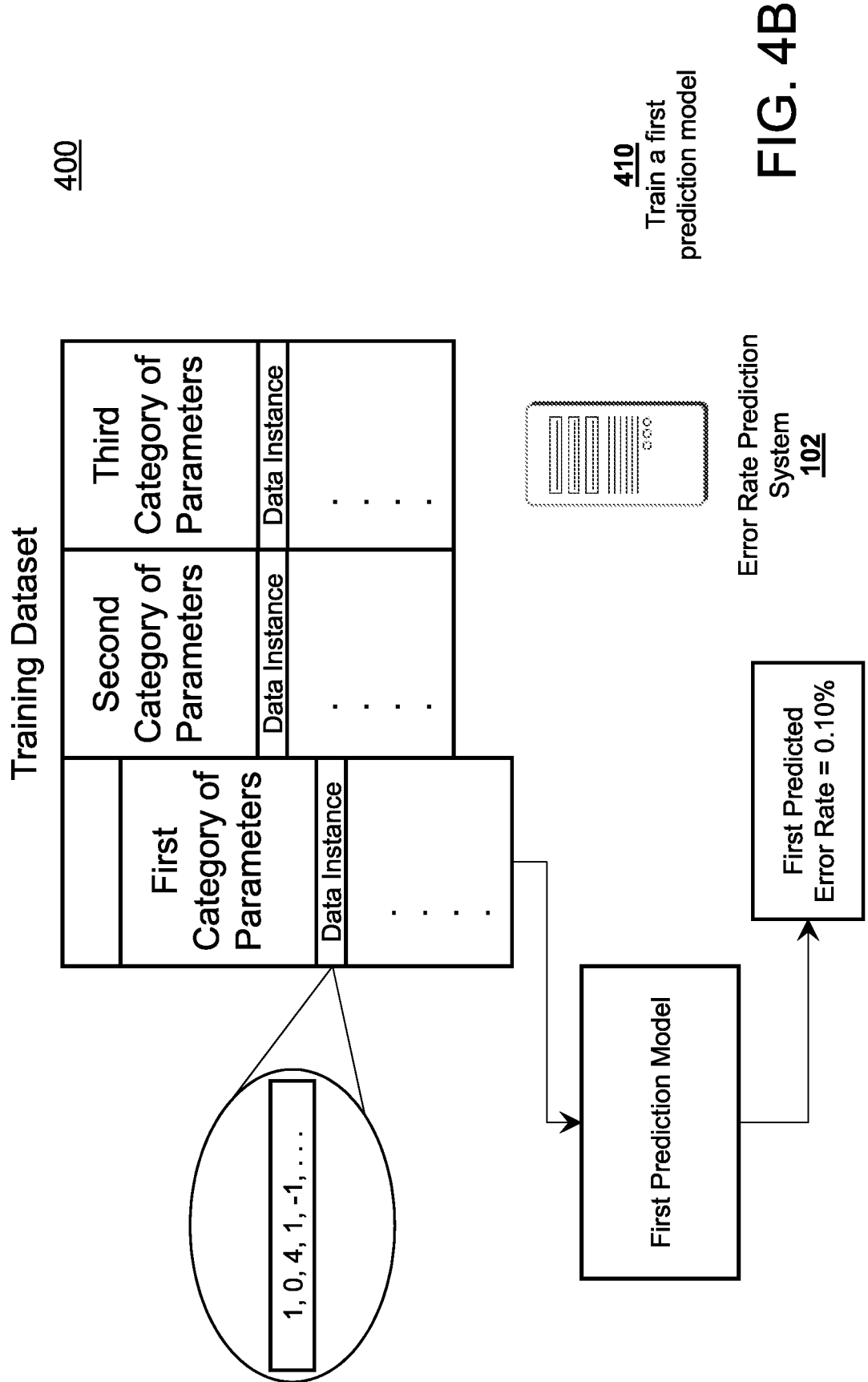

As shown by reference number 410 in FIG. 4B, error rate prediction system 102 may train a first prediction model. In some non-limiting embodiments or aspects, error rate prediction system 102 may train the first prediction model based on the data instances corresponding to the first category of parameters. In some non-limiting embodiments or aspects, the first prediction model may be configured to provide an output that includes a first predicted error rate. In some non-limiting embodiments or aspects, the first predicted error rate may represent a probability that generating a data report (e.g., generating a data report based on a user report input) will produce an error. In some non-limiting embodiments or aspects, the first predicted error rate may be based on a parameter in the first category of parameters that is to be included or not included in the data report. For example, the first predicted error rate may represent a probability that generating a data report will produce an error based on an attribute that is to be included or not included (e.g., selected or not selected by a user) in the data report.

In some non-limiting embodiments or aspects, the data instances corresponding to the first category of parameters may include one or more data points. In some non-limiting embodiments or aspects, each data point of the one or more data points may correspond to a parameter in the first category of parameters. In some non-limiting embodiments or aspects, each of the one or more data points may include an integer representing whether the parameter corresponding to the data point is to be included or not included in the data report.

In some non-limiting embodiments or aspects, the first predicted error rate may include a percentage. In some non-limiting embodiments or aspects, the first predicted error rate may be compared to a first target error rate. In some non-limiting embodiments or aspects, the first target error rate may include an error rate that is calculated based on the at least one data instance corresponding to the second category of parameters.

In some non-limiting embodiments or aspects, the first prediction model may be trained using backpropagation. In some non-limiting embodiments or aspects, a gradient descent optimizer may be used to minimize a difference between the first predicted error rate and the first target error rate. For example, a gradient descent optimizer may be used to minimize a difference between the first predicted error rate and the first target error rate, and the difference may be used to train the first prediction model. Accordingly, weights of the first prediction model may then be adjusted to cause the value of the first predicted output to approach the value of the first target output.

Figure 4C:
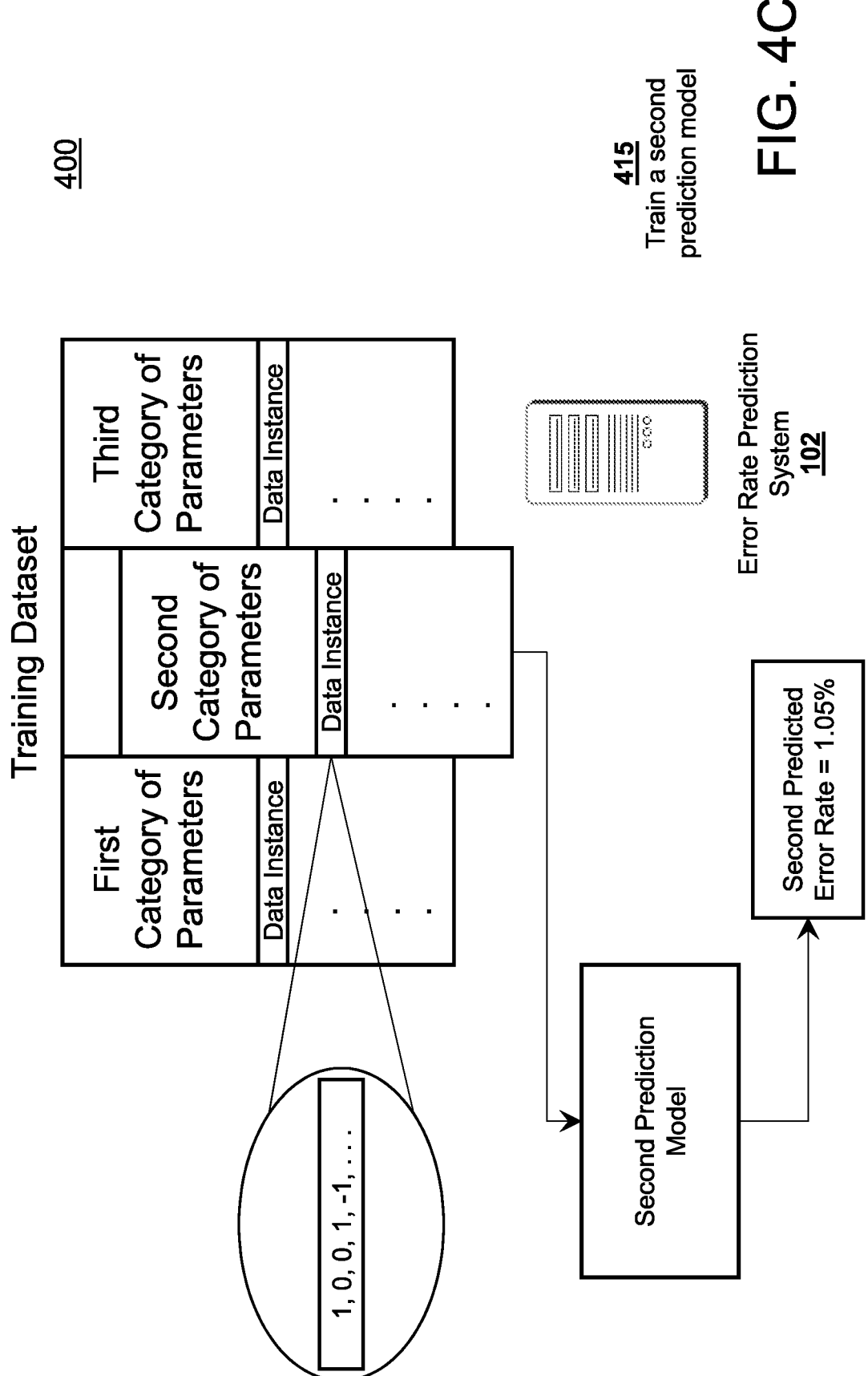

As shown by reference number 415 in FIG. 4C, error rate prediction system 102 may train a second prediction model. In some non-limiting embodiments or aspects, error rate prediction system 102 may train the second prediction model based on the data instances corresponding to the second category of parameters. In some non-limiting embodiments or aspects, the second prediction model may be configured to provide an output that includes a second predicted error rate. In some non-limiting embodiments or aspects, the second predicted error rate may represent a probability that generating a data report (e.g., generating a data report based on a user report input) will produce an error. In some non-limiting embodiments or aspects, the second predicted error rate may be based on a parameter in the second category of parameters that is to be included or not included in the data report. For example, the second predicted error rate may represent a probability that generating a data report will produce an error based on a metric that is to be included or not included (e.g., selected or not selected by a user) in the data report.

In some non-limiting embodiments or aspects, the data instances corresponding to the second category of parameters may include one or more data points. In some non-limiting embodiments or aspects, each data point of the one or more data points may correspond to a parameter in the second category of parameters. In some non-limiting embodiments or aspects, each of the one or more data points may include an integer representing whether the parameter corresponding to the data point is to be included or not included in the data report.

In some non-limiting embodiments or aspects, the second predicted error rate may include a percentage. In some non-limiting embodiments or aspects, the second predicted error rate may be compared to a second target error rate. In some non-limiting embodiments or aspects, the second target error rate may include an error rate that is calculated based on the at least one data instance corresponding to the second category of parameters.

In some non-limiting embodiments or aspects, the second prediction model may be trained using backpropagation. In some non-limiting embodiments or aspects, a gradient descent optimizer may be used to minimize a difference between the second predicted error rate and the second target error rate. For example, a gradient descent optimizer may be used to minimize a difference between the second predicted error rate and the second target error rate, and the difference may be used to train the second prediction model. Accordingly, weights of the second prediction model may then be adjusted to cause the value of the second predicted output to approach the value of the second target output.

Figure 4D:
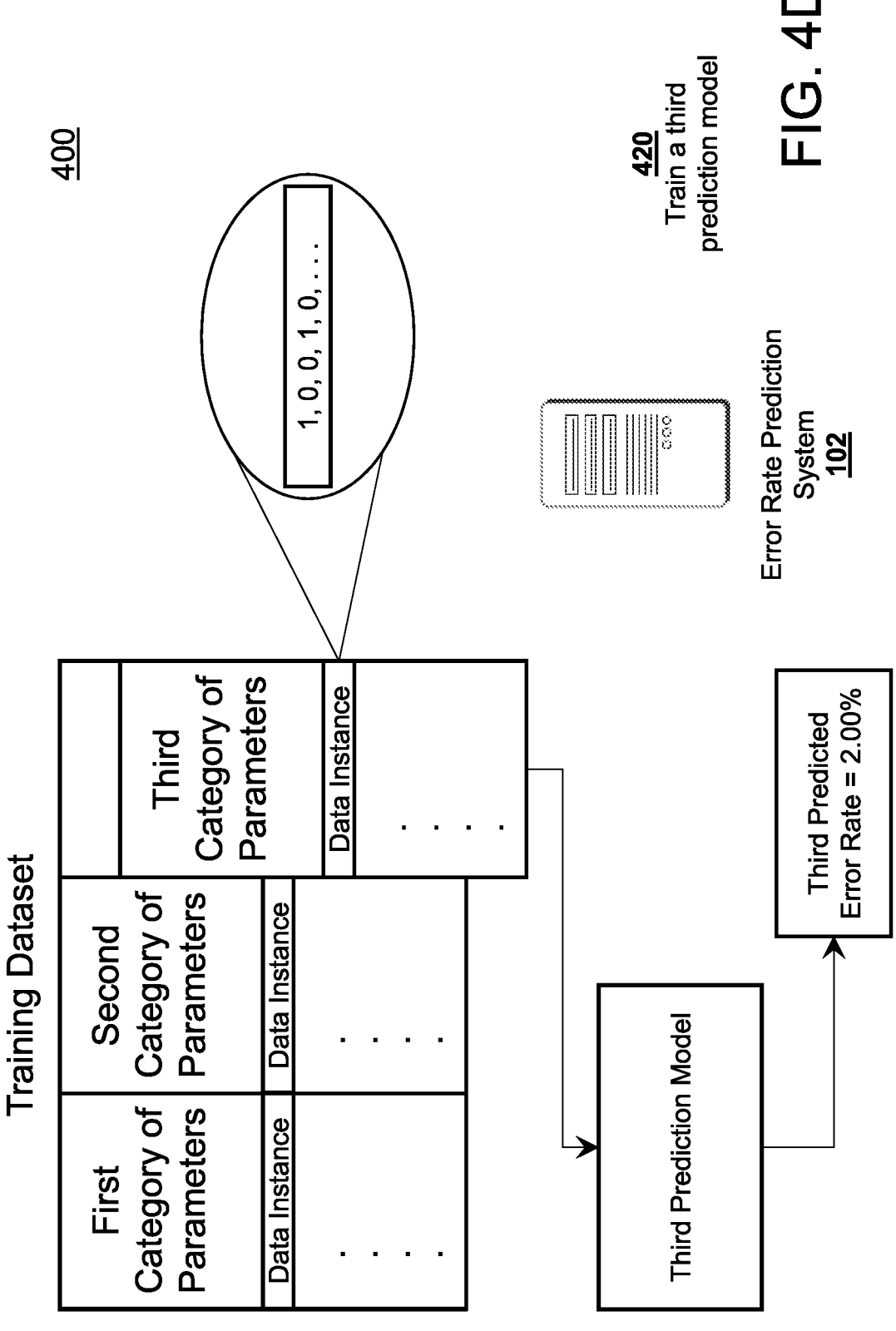

As shown by reference number 420 in FIG. 4D, error rate prediction system 102 may train a third prediction model. In some non-limiting embodiments or aspects, error rate prediction system 102 may train the third prediction model based on the data instances corresponding to the third category of parameters. In some non-limiting embodiments or aspects, the third prediction model may be configured to provide an output that includes a third predicted error rate. In some non-limiting embodiments or aspects, the third predicted error rate may represent a probability that generating a data report (e.g., generating a data report based on a user report input) will produce an error. In some non-limiting embodiments or aspects, the third predicted error rate may be based on a parameter in the third category of parameters that is to be included or not included in the data report. For example, the third predicted error rate may represent a probability that generating a data report will produce an error based on a filter that is to be included or not included (e.g., selected or not selected by a user) in the data report.

In some non-limiting embodiments or aspects, the data instances corresponding to the third category of parameters may include one or more data points. In some non-limiting embodiments or aspects, each data point of the one or more data points may correspond to a parameter in the third category of parameters. In some non-limiting embodiments or aspects, each of the one or more data points may include an integer representing whether the parameter corresponding to the data point is to be included or not included in the data report. For example, each of the one or more data points may include a "0" or a "1", where a "0" represents that the parameter corresponding to the data point is not to be included in the data report and a "1" represents that the parameter corresponding to the data point is to be included in the data report.

In some non-limiting embodiments or aspects, the third predicted error rate may include a percentage. In some non-limiting embodiments or aspects, the third predicted error rate may be compared to a third target error rate. In some non-limiting embodiments or aspects, the third target error rate may include an error rate that is calculated based on the at least one data instance corresponding to the third category of parameters.

In some non-limiting embodiments or aspects, the third prediction model may be trained using backpropagation. In some non-limiting embodiments or aspects, a gradient descent optimizer may be used to minimize a difference between the third predicted error rate and the third target error rate. For example, a gradient descent optimizer may be used to minimize a difference between the third predicted error rate and the third target error rate, and the difference may be used to train the third prediction model. Accordingly, weights of the third prediction model may then be adjusted to cause the value of the third predicted output to approach the value of the third target output.

Figure 4E:
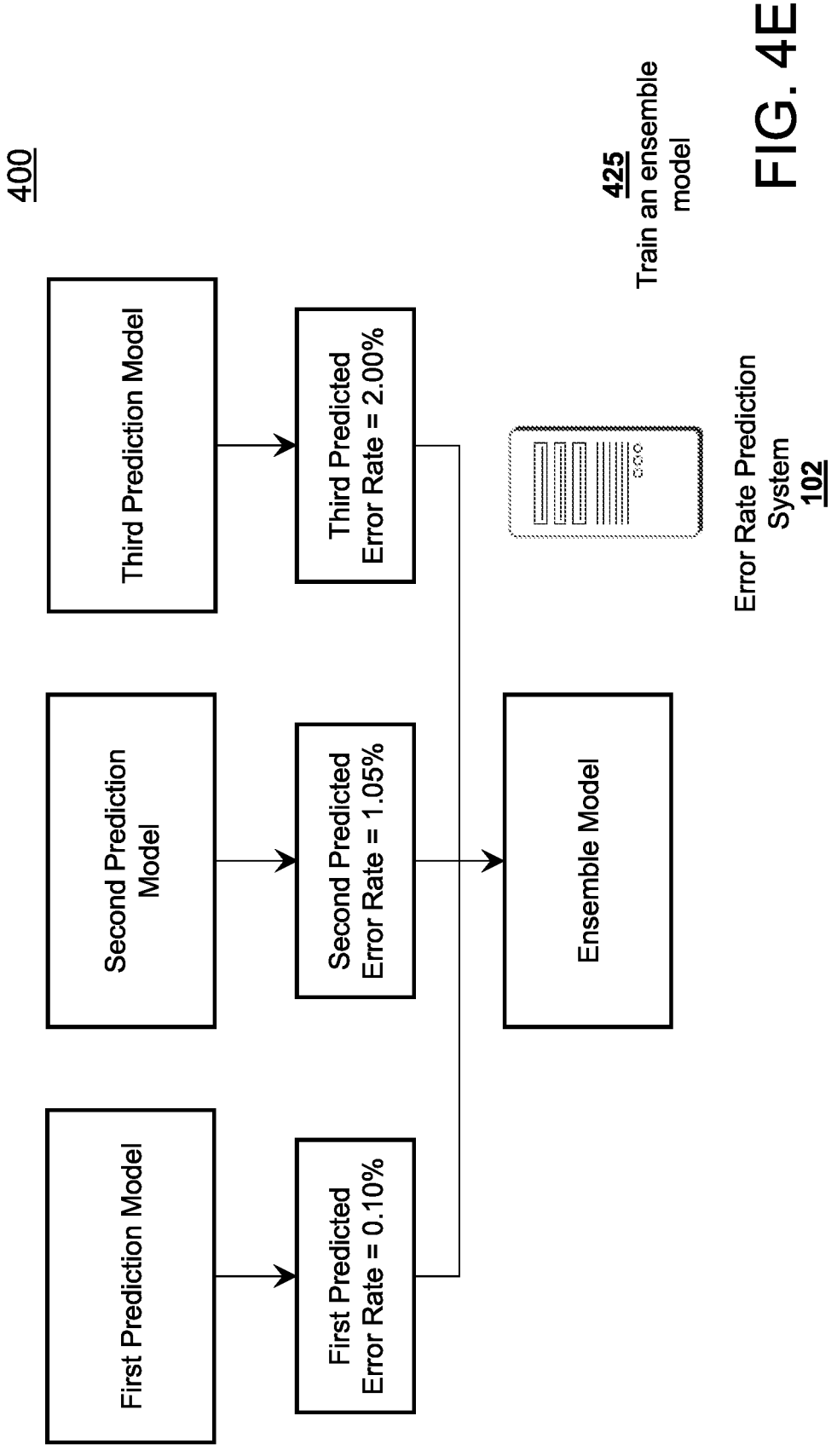

As shown by reference number 425 in FIG. 4E, error rate prediction system 102 may train an ensemble model. In some non-limiting embodiments or aspects, error rate prediction system 102 may train an ensemble machine learning model based on an output of the first prediction model, an output of the second prediction model, and an output of the third prediction model. In some non-limiting embodiments or aspects, the output of the first prediction model, the output of the second prediction model, and the output of the third prediction model may be provided as inputs to the ensemble machine learning model for training. In some non-limiting embodiments or aspects, error rate prediction system 102 may train the ensemble machine learning model to provide a trained ensemble machine learning model. In some non-limiting embodiments or aspects, the output of the first prediction model may include the first predicted error rate (e.g., a percentage). In some non-limiting embodiments or aspects, the output of the second prediction model may include the second predicted error rate. In some non-limiting embodiments or aspects, the output of the third prediction model may include the third predicted error rate.

Figure 4F:
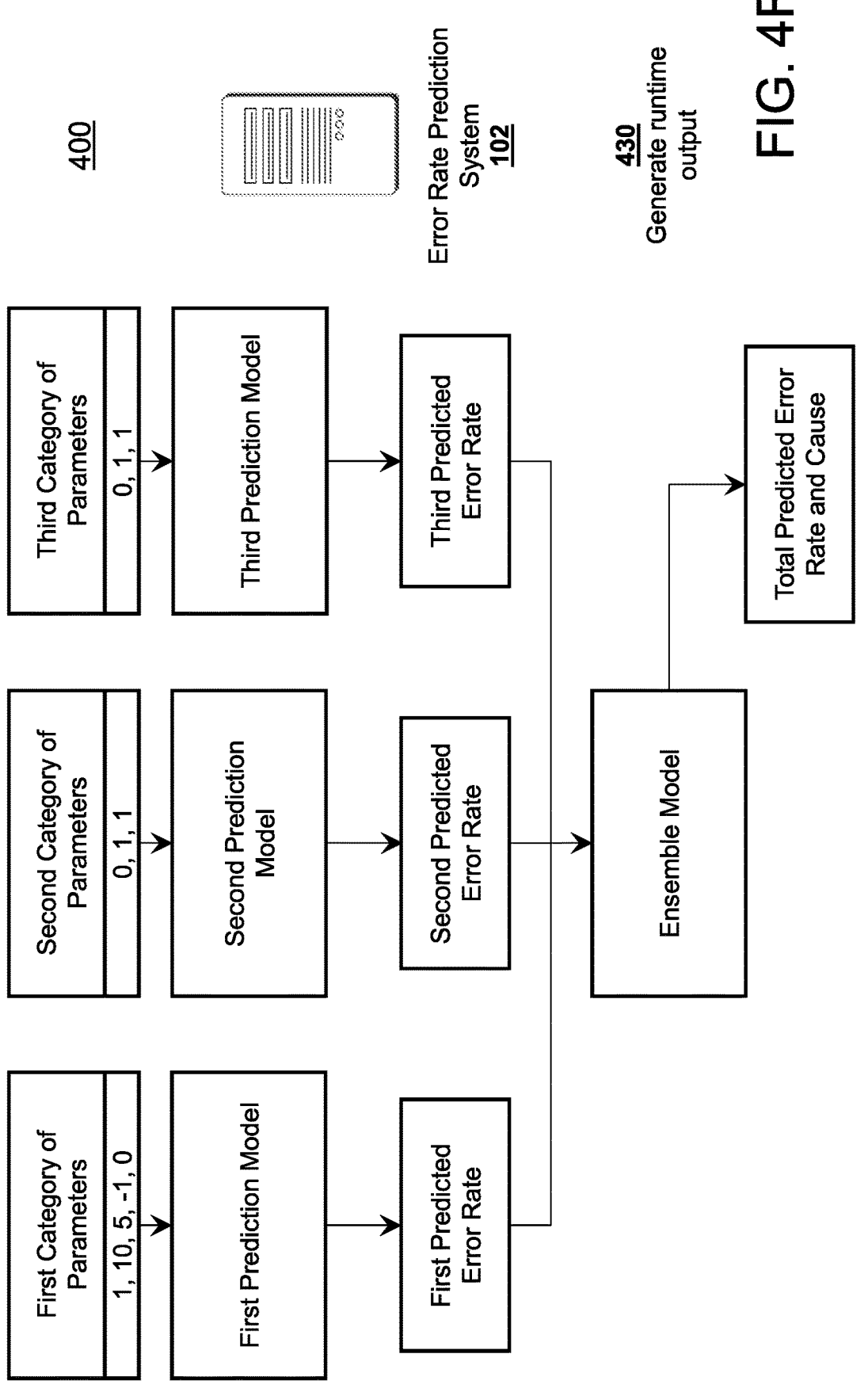

As shown by reference number 430 in FIG. 4F, error rate prediction system 102 may generate a runtime output. In some non-limiting embodiments or aspects, error rate prediction system 102 may generate a runtime output of the trained ensemble machine learning model based on a runtime input. In some non-limiting embodiments or aspects, the runtime output may include a prediction of a total error rate and an indication of a predicted cause of the total error rate. In some non-limiting embodiments or aspects, the prediction of the total error rate and the indication of a predicted cause of the total error rate may be based on one or more parameters selected by a user (e.g., the one or more parameters of the first, second, or third category of parameters selected by the user in the user report input).

In some non-limiting embodiments or aspects, the total predicted error rate may include a percentage. In some non-limiting embodiments or aspects, the total predicted error rate may include a percentage representing a probability that an error may be encountered when generating a data report using a data reporting system (e.g., a software data reporting tool). In some non-limiting embodiments or aspects, the total predicted error rate may be compared to a total target error rate. In some non-limiting embodiments or aspects, the total target error rate may include an error rate that is calculated based on a subset of the plurality of data instances (e.g., the subset of data instances corresponding to a user report input).

In some non-limiting embodiments or aspects, the ensemble machine learning model may be trained using backpropagation. In some non-limiting embodiments or aspects, a gradient descent optimizer may be used to minimize a difference between the total predicted error rate and the total target error rate. For example, a gradient descent optimizer may be used to minimize a difference between the total predicted error rate and the total target error rate, and the difference may be used to further train the ensemble machine learning model. Accordingly, weights of the ensemble machine learning model may be adjusted to cause the value of the total predicted output to approach the value of the total target output.

In some non-limiting embodiments or aspects, the indication of a predicted cause for the total predicted error rate may include one or more parameters which may have impacted the total predicted error rate. In some non-limiting embodiments or aspects, the indication of a predicted cause of the total predicted error rate may be based on one or more weights included in the ensemble machine learning model. For example, the weights represent the impact an input may have on a final output. A weight may indicate how much influence the input may have on the final output. The weights of the ensemble machine learning model may be accessed to determine the indication of a predicted cause of the total predicted error rate. In some non-limiting embodiments or aspects, the weights may be back-propagated from an output layer of the ensemble machine learning model to an input layer of the ensemble machine learning model. In some non-limiting embodiments or aspects, using the weights for backpropagation with the ensemble machine learning model may identify one or more inputs (e.g., one or more parameters) that may have had an impact on the total predicted error rate to be included in the indication of a predicted cause of the total predicted error rate. For example, using the weights for backpropagation with the ensemble machine learning model may identify that an attribute and/or a metric that were selected by a user (e.g., included in the user report input) should be included in the indication of a predicted cause for the total predicted error rate (e.g., attribute X and/or metric Y impacted the total predicted error rate).

In some non-limiting embodiments or aspects, error rate prediction system 102 may perform an action based on the runtime output of the trained ensemble machine learning model. For example, error rate prediction system 102 may cause a data reporting system to generate or not generate a data report using the runtime input (e.g., a user report input) based on the total predicted error rate satisfying or not satisfying a threshold. In some non-limiting embodiments or aspects, error rate prediction system 102 may perform an action based on the total predicted error rate of the runtime output and/or the indication of a predicted cause of the total predicted error rate of the runtime output. For example, error rate prediction system 102 may cause a data reporting system to not generate a data report using the runtime input (e.g., a user report input) based on the indication of the predicted cause of the total predicted error rate indicating a certain parameter (e.g., an attribute).

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system comprising:

at least one processor programmed or configured to:

receive a dataset of a plurality of data instances, wherein the plurality of data instances comprises at least one data instance corresponding to a first category of parameters, at least one data instance corresponding to a second category of parameters, and at least one data instance corresponding to a third category of parameters;

train a first prediction model based on the data instances corresponding to the first category of parameters, wherein the first category of parameters comprises attributes, wherein an attribute is a text string and the at least one data instance corresponding to the first category of parameters comprises a plurality of data points, wherein each data point is an integer representing the attribute that is to be included or not included in a data report, wherein the first prediction model is configured to provide an output that comprises a first predicted error rate, and wherein the first predicted error rate represents a probability that generating the data report will produce an error based on a parameter in the first category of parameters that is to be included or not included in the data report;

train a second prediction model based on the data instances corresponding to the second category of parameters, wherein the second category of parameters comprises metrics, wherein a metric is a numerical value and the at least one data instance corresponding to the second category of parameters comprises a plurality of data points, wherein each data point is an integer representing the metric that is to be included or not included in a data report, wherein the second prediction model is configured to provide an output that comprises a second predicted error rate, and wherein the second predicted error rate represents a probability that generating the data report will produce an error based on a parameter in the second category of parameters that is to be included or not included in the data report;

train a third prediction model based on the data instances corresponding to the third category of parameters, wherein the third category of parameters comprises filters, wherein a filter is a predefined text string or a predefined numerical value, and the at least one data instance corresponding to the third category of parameters comprises a plurality of data points, wherein each data point is an integer equal to 1 or 0, wherein the integer equal to 1 represents the filter that is included in a data report and the integer equal to 0 represents the filter that is not included in the data report, wherein the third prediction model is configured to provide an output that comprises a third predicted error rate, and wherein the third predicted error rate represents a probability that generating a data report will produce an error based on a parameter in the third category of parameters that is to be included or not included in the data report;

train an ensemble machine learning model based on an output of the first prediction model, an output of the second prediction model, and an output of the third prediction model to provide a trained ensemble machine learning model; and generate a runtime output of the trained ensemble machine learning model based on a runtime input, wherein the runtime output comprises a prediction of a total error rate and an indication of a predicted cause of the total error rate based on one or more parameters selected by a user, and wherein, when generating the runtime output of the trained ensemble machine learning model, the at least one processor is programmed or configured to:

generate a first runtime error rate with the first prediction model;

generate a second runtime error rate with the second prediction model;

generate a third runtime error rate with the third prediction model;

generate a total error rate based on the first runtime error rate, the second runtime error rate, and the third runtime error rate; and generate an indication of a predicted cause of the total error rate with the trained ensemble machine learning model based on the one or more parameters selected by the user for a data report associated with the runtime input.

2. The system of claim 1, wherein the at least one processor is further programmed or configured to:

perform an action based on the runtime output of the trained ensemble machine learning model.

3. The system of claim 1, wherein, when receiving the dataset of the plurality of data instances, the at least one processor is programmed or configured to:

perform a normalization operation on the plurality of data instances to provide a plurality of normalized data instances, wherein each data instance comprises a plurality of data points, and wherein each data point has a value from 0 to 1.

4. The system of claim 1, wherein, when generating a runtime output of the trained ensemble machine learning model, the at least one processor is programmed or configured to:

receive a first data instance corresponding to the first category of parameters, wherein the first data instance comprises a plurality of data points, and wherein each data point is an integer representing a first parameter that is selected by the user to be included or not included in the data report;

receive a second data instance corresponding to the second category of parameters, wherein the second data instance comprises a plurality of data points, and wherein each data point is an integer representing a second parameter that is selected by the user to be included or not included in the data report;

receive a third data instance corresponding to the third category of parameters, wherein the third data instance comprises a plurality of data points, and wherein each data point is an integer representing a third parameter that is selected by the user to be included or not included in the data report;

generate a first runtime error rate with the first prediction model based on the first data instance;

generate a second runtime error rate with the second prediction model based on the second data instance;

generate a third runtime error rate with the third prediction model based on the third data instance; and generate the total error rate and the indication of the predicted cause of the total error rate with the trained ensemble machine learning model based on the first runtime error rate, the second runtime error rate, and the third runtime error rate.

5. The system of claim 1, wherein the first category of parameters is attributes, wherein an attribute is a text string and the at least one data instance corresponding to the first category of parameters comprises a plurality of data points, and wherein each data point is an integer representing the attribute that is to be included or not included in the data report.

6. The system of claim 1, wherein the second category of parameters is metrics, wherein a metric is a numerical value and the at least one data instance corresponding to the second category of parameters comprises a plurality of data points, and wherein each data point is an integer representing the metric that is to be included or not included in the data report.

7. The system of claim 1, wherein the third category of parameters is filters, wherein a filter is a predefined text string or a predefined numerical value, and the at least one data instance corresponding to the third category of parameters comprises a plurality of data points, wherein each data point is an integer equal to 1 or 0, and wherein the integer equal to 1 represents the filter that is included in the data report and the integer equal to 0 represents the filter that is not included in the data report.

8. A method comprising:

receiving, with at least one processor, a dataset of a plurality of data instances, wherein the plurality of data instances comprises at least one data instance corresponding to a first category of parameters, at least one data instance corresponding to a second category of parameters, and at least one data instance corresponding to a third category of parameters;

training, with the at least one processor, a first prediction model based on the data instances corresponding to the first category of parameters, wherein the first category of parameters comprises attributes, wherein an attribute is a text string and the at least one data instance corresponding to the first category of parameters comprises a plurality of data points, wherein each data point is an integer representing the attribute that is to be included or not included in a data report, wherein the first prediction model is configured to provide an output that comprises a first predicted error rate, and wherein the first predicted error rate represents a probability that generating the data report will produce an error based on a parameter in the first category of parameters that is to be included or not included in the data report;

training, with the at least one processor, a second prediction model based on the data instances corresponding to the second category of parameters, wherein the second category of parameters comprises metrics, wherein a metric is a numerical value and the at least one data instance corresponding to the second category of parameters comprises a plurality of data points, wherein each data point is an integer representing the metric that is to be included or not included in the data report, wherein the second prediction model is configured to provide an output that comprises a second predicted error rate, and wherein the second predicted error rate represents a probability that generating the data report will produce an error based on a parameter in the second category of parameters that is to be included or not included in the data report;

training, with the at least one processor, a third prediction model based on the data instances corresponding to the third category of parameters, wherein the third category of parameters comprises filters, wherein a filter is a predefined text string or a predefined numerical value, and the at least one data instance corresponding to the third category of parameters comprises a plurality of data points, wherein each data point is an integer equal to 1 or 0, wherein the integer equal to 1 represents the filter that is included in the data report and the integer equal to 0 represents the filter that is not included in the data report, wherein the third prediction model is configured to provide an output that comprises a third predicted error rate, and wherein the third predicted error rate represents a probability that generating a data report will produce an error based on a parameter in the third category of parameters that is to be included or not included in the data report;

training, with the at least one processor, an ensemble machine learning model based on an output of the first prediction model, an output of the second prediction model, an output of the third prediction model to provide a trained ensemble machine learning model; and generating, with the at least one processor, a runtime output of the trained ensemble machine learning model based on a runtime input, wherein the runtime output comprises a prediction of a total error rate and an indication of a predicted cause of the total error rate based on one or more parameters selected by a user, and wherein generating the runtime output of the trained ensemble machine learning model comprises:

generating a first runtime error rate with the first prediction model;

generating a second runtime error rate with the second prediction model;

generating a third runtime error rate with the third prediction model;

generating a total error rate based on the first runtime error rate, the second runtime error rate, and the third runtime error rate; and generating an indication of a predicted cause of the total error rate with the trained ensemble machine learning model based on the one or more parameters selected by the user for a data report associated with the runtime input.

9. The method of claim 8, further comprising:

performing an action based on the runtime output of the trained ensemble machine learning model.

10. The method of claim 8, wherein receiving the dataset of the plurality of data instances comprises:

performing a normalization operation on the plurality of data instances to provide a plurality of normalized data instances, wherein each data instance comprises a plurality of data points, and wherein each data point has a value from 0 to 1.

11. The method of claim 8, wherein generating a runtime output of the trained ensemble machine learning model comprises:

receiving a first data instance corresponding to the first category of parameters, wherein the first data instance comprises a plurality of data points, and wherein each data point is an integer representing a first parameter that is selected by the user to be included or not included in the data report;

receiving a second data instance corresponding to the second category of parameters, wherein the second data instance comprises a plurality of data points, and wherein each data point is an integer representing a second parameter that is selected by the user to be included or not included in the data report;

receiving a third data instance corresponding to the third category of parameters, wherein the third data instance comprises a plurality of data points, and wherein each data point is an integer representing a third parameter that is selected by the user to be included or not included in the data report;

generating a first runtime error rate with the first prediction model based on the first data instance;

generating a second runtime error rate with the second prediction model based on the second data instance;

generating a third runtime error rate with the third prediction model based on the third data instance; and generating the total error rate and the indication of the predicted cause of the total error rate with the trained ensemble machine learning model based on the first runtime error rate, the second runtime error rate, and the third runtime error rate.

12. The method of claim 8, wherein the first category of parameters is attributes, wherein an attribute is a text string and the at least one data instance corresponding to the first category of parameters comprises a plurality of data points, and wherein each data point is an integer representing the attribute that is to be included or not included in the data report.

13. The method of claim 8, wherein the second category of parameters is metrics, wherein a metric is a numerical value and the at least one data instance corresponding to the second category of parameters comprises a plurality of data points, and wherein each data point is an integer representing the metric that is to be included or not included in the data report.

14. The method of claim 8, wherein the third category of parameters is filters, wherein a filter is a predefined text string or a predefined numerical value, and the at least one data instance corresponding to the third category of parameters comprises a plurality of data points, wherein each data point is an integer equal to 1 or 0, and wherein the integer equal to 1 represents the filter that is included in the data report and the integer equal to 0 represents the filter that is not included in the data report.

15. A computer program product, the computer program product comprising at least one non-transitory computer-readable medium including one or more instructions that, when executed by at least one processor, cause the at least one processor to:

receive a dataset of a plurality of data instances, wherein the plurality of data instances comprises at least one data instance corresponding to a first category of parameters, at least one data instance corresponding to a second category of parameters, and at least one data instance corresponding to a third category of parameters;

train a first prediction model based on the data instances corresponding to the first category of parameters, wherein the first category of parameters comprises attributes, wherein an attribute is a text string and the at least one data instance corresponding to the first category of parameters comprises a plurality of data points, wherein each data point is an integer representing the attribute that is to be included or not included in a data report, wherein the first prediction model is configured to provide an output that comprises a first predicted error rate, and wherein the first predicted error rate represents a probability that generating the data report will produce an error based on a parameter in the first category of parameters that is to be included or not included in the data report;

train a second prediction model based on the data instances corresponding to the second category of parameters, wherein the second category of parameters comprises metrics, wherein a metric is a numerical value and the at least one data instance corresponding to the second category of parameters comprises a plurality of data points, wherein each data point is an integer representing the metric that is to be included or not included in the data report, wherein the second prediction model is configured to provide an output that comprises a second predicted error rate, and wherein the second predicted error rate represents a probability that generating the data report will produce an error based on a parameter in the second category of parameters that is to be included or not included in the data report;

train a third prediction model based on the data instances corresponding to the third category of parameters, wherein the third category of parameters comprises filters, wherein a filter is a predefined text string or a predefined numerical value, and the at least one data instance corresponding to the third category of parameters comprises a plurality of data points, wherein each data point is an integer equal to 1 or 0, wherein the integer equal to 1 represents the filter that is included in the data report and the integer equal to 0 represents the filter that is not included in the data report, wherein the third prediction model is configured to provide an output that comprises a third predicted error rate, and wherein the third predicted error rate represents a probability that generating a data report will produce an error based on a parameter in the third category of parameters that is to be included or not included in the data report;

train an ensemble machine learning model based on an output of the first prediction model, an output of the second prediction model, and an output of the third prediction model to provide a trained ensemble machine learning model; and generate a runtime output of the trained ensemble machine learning model based on a runtime input, wherein the runtime output comprises a prediction of a total error rate and an indication of a predicted cause of the total error rate based on one or more parameters selected by a user, and wherein, the one or more instructions that cause the at least one processor to generate the runtime output of the trained ensemble machine learning model, cause the at least one processor to:

generate a first runtime error rate with the first prediction model;

generate a second runtime error rate with the second prediction model;

generate a third runtime error rate with the third prediction model;

generate a total error rate based on the first runtime error rate, the second runtime error rate, and the third runtime error rate; and generate an indication of a predicted cause of the total error rate with the trained ensemble machine learning model based on the one or more parameters selected by the user for a data report associated with the runtime input.

16. The computer program product of claim 15, wherein the one or more instructions further cause the at least one processor to:

perform an action based on the runtime output of the trained ensemble machine learning model.

17. The computer program product of claim 15, wherein, the one or more instructions that cause the at least one processor to generate a runtime output of the trained ensemble machine learning model, cause the at least one processor to:

receive a first data instance corresponding to the first category of parameters, wherein the first data instance comprises a plurality of data points, and wherein each data point is an integer representing a first parameter that is selected by the user to be included or not included in the data report;

receive a second data instance corresponding to the second category of parameters, wherein the second data instance comprises a plurality of data points, and wherein each data point is an integer representing a second parameter that is selected by the user to be included or not included in the data report;

receive a third data instance corresponding to the third category of parameters, wherein the third data instance comprises a plurality of data points, and wherein each data point is an integer representing a third parameter that is selected by the user to be included or not included in the data report;

generate a first runtime error rate with the first prediction model based on the first data instance;

generate a second runtime error rate with the second prediction model based on the second data instance;

generate a third runtime error rate with the third prediction model based on the third data instance; and generate the total error rate and the indication of the predicted cause of the total error rate with the trained ensemble machine learning model based on the first runtime error rate, the second runtime error rate, and the third runtime error rate.

18. The computer program product of claim 15, wherein the first category of parameters is attributes, wherein an attribute is a text string and the at least one data instance corresponding to the first category of parameters comprises a plurality of data points, and wherein each data point is an integer representing the attribute that is to be included or not included in the data report.

19. The computer program product of claim 15, wherein the second category of parameters is metrics, wherein a metric is a numerical value and the at least one data instance corresponding to the second category of parameters comprises a plurality of data points, and wherein each data point is an integer representing the metric that is to be included or not included in the data report.

20. The computer program product of claim 15, wherein the third category of parameters is filters, wherein a filter is a predefined text string or a predefined numerical value, and the at least one data instance corresponding to the third category of parameters comprises a plurality of data points, wherein each data point is an integer equal to 1 or 0, and wherein the integer equal to 1 represents the filter that is included in the data report and the integer equal to 0 represents the filter that is not included in the data report.

* * * * *